(12) United States Patent
Miyauchi

(10) Patent No.: US 6,282,509 B1
(45) Date of Patent: Aug. 28, 2001

(54) THESAURUS RETRIEVAL AND SYNTHESIS SYSTEM

(75) Inventor: Tadanobu Miyauchi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/169,002

(22) Filed: Oct. 9, 1998

(30) Foreign Application Priority Data

Nov. 18, 1997 (JP) .................................................. 9-333489

(51) Int. Cl.⁷ .................................................. G06F 17/21
(52) U.S. Cl. .............................................. 704/10; 707/532
(58) Field of Search .................... 704/1, 9, 10; 707/530, 707/531, 532

(56) References Cited

U.S. PATENT DOCUMENTS

| | | | |
|---|---|---|---|
| 4,972,328 | * 11/1990 | Wu et al. | 706/59 |
| 5,267,156 | * 11/1993 | Nomiyama | 704/2 |
| 5,644,740 | * 7/1997 | Kiuchi | 345/357 |
| 5,696,885 | * 12/1997 | Hekmatpour | 706/59 |
| 5,696,916 | * 12/1997 | Yamazaki et al. | 346/356 |
| 6,076,088 | * 6/2000 | Paik et al. | 707/5 |

FOREIGN PATENT DOCUMENTS

| | | | | |
|---|---|---|---|---|
| A-3-276369 | 12/1991 | (JP) | ........................ | G06F/17/30 |
| A-4-39769 | 2/1992 | (JP) | ........................ | G06F/17/30 |
| A-4-237332 | 8/1992 | (JP) | ........................ | G06F/17/30 |
| A-7-319885 | 12/1995 | (JP) | ........................ | G06F/17/30 |
| A-8-16620 | 1/1996 | (JP) | ........................ | G06F/17/30 |
| A-8-235194 | 9/1996 | (JP) | ........................ | G06F/17/30 |
| A-9-6789 | 1/1997 | (JP) | ........................ | G06F/17/30 |

OTHER PUBLICATIONS

"Special Edition: Archive Creation and Retrieval" *Internetworking* (ASCII Corporation), Aug. 1997, pp. 23–43.

* cited by examiner

Primary Examiner—Patrick N. Edouard
(74) Attorney, Agent, or Firm—Oliff & Berridge, PLC.

(57) ABSTRACT

Thesauruses meeting users' purposes are generated by various operations as required. A plurality of external thesauruses 2 each storing a thesaurus to be retrieved are connected to a thesaurus retrieval and synthesis device 3 through a network 1, wherein the thesaurus retrieval and synthesis device 3, on receiving a request to define the thesauruses to be synthesized from an input unit 5, retrieves partial thesauruses corresponding to the request from the external thesauruses 2 in a retrieval unit 32. A synthesis unit 33 forms a new thesaurus from a plurality of retrieved partial thesauruses by subjecting them to product, addition, and other operations corresponding to the request.

8 Claims, 23 Drawing Sheets

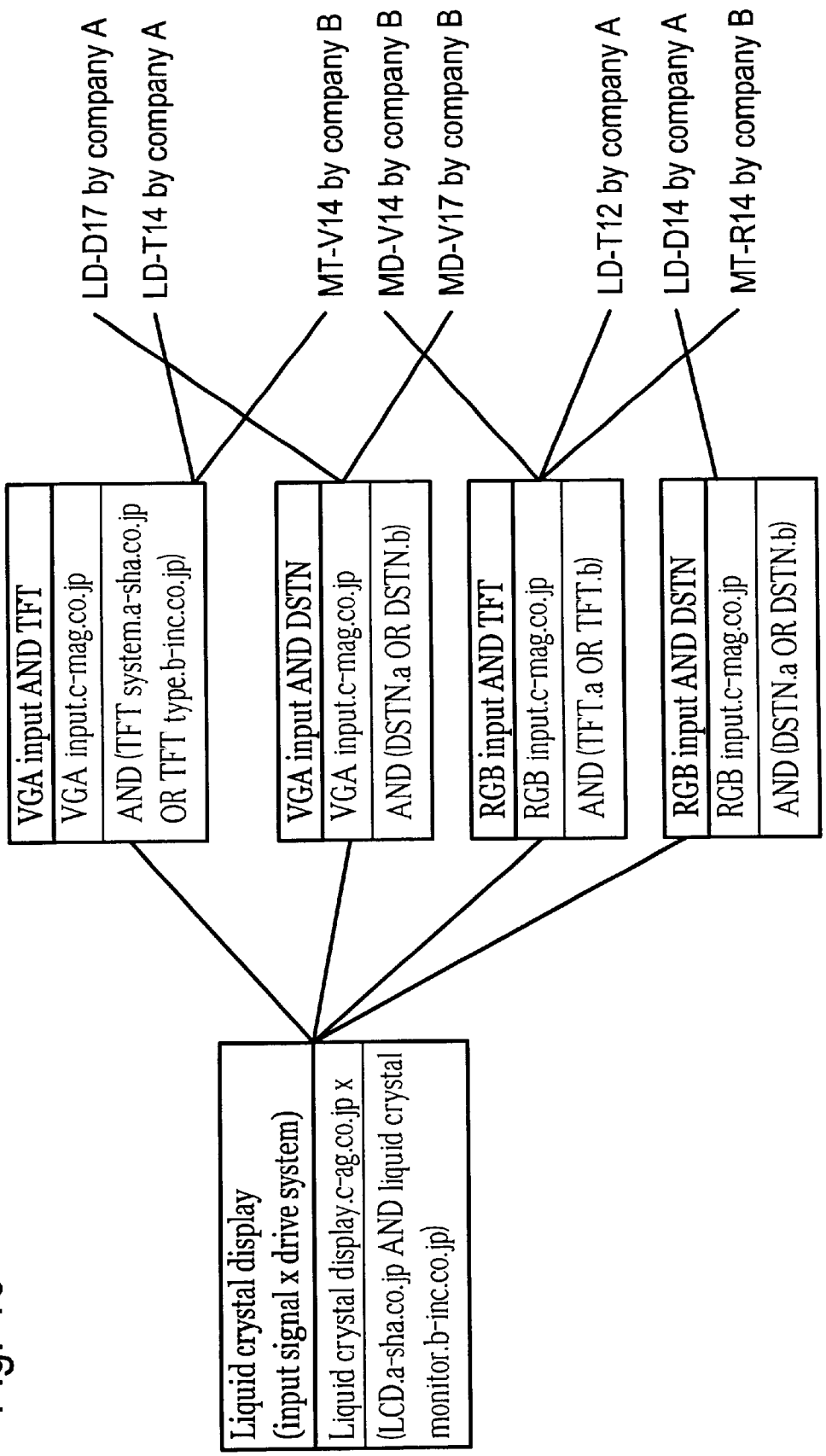

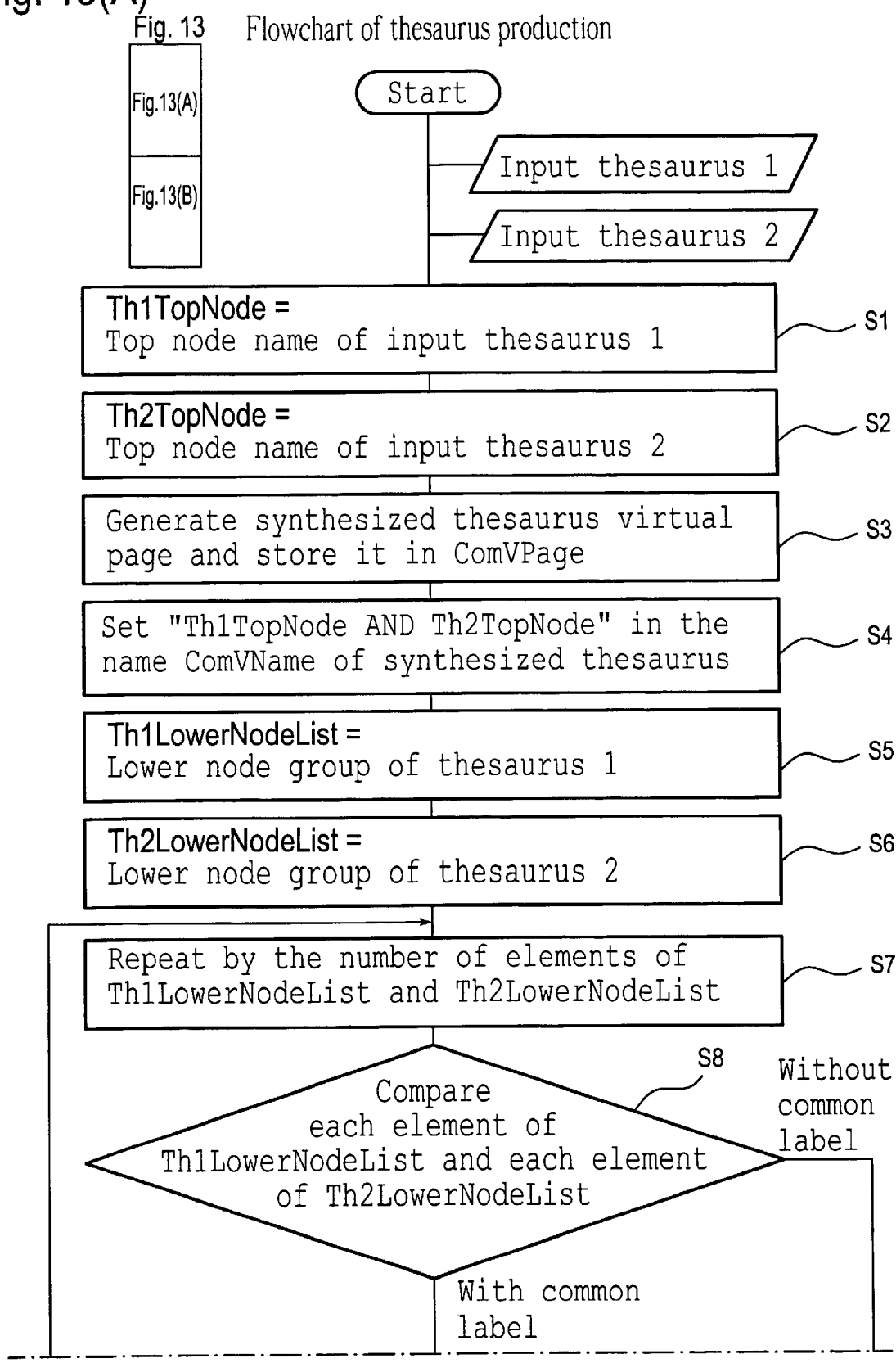

Flowchart of thesaurus match level synthesis (m input)

Fig. 15  Flowchart of thesaurus addition

Flowchart of thesaurus transposition

THESAURUS RETRIEVAL AND SYNTHESIS SYSTEM

BACKGROUND OF THE INVENTION

Field of the Invention

The present invention relates to a system which can generate thesauruses as required by various operations to meet users' purposes.

Conventionally, research has been actively done on text retrieval and automatic classification as part of natural language processing techniques. In such fields, there is increasing importance of a so-called knowledge base, particularly one in which relations among concepts called a thesaurus are hierarchically defined primarily based on rank relations.

The flow of knowledge processing having been proposed conventionally is broadly divided into a rule-based approach and a example-based approach.

The rule-based approach performs knowledge processing by mapping the real world into a combination of defined rules. In a production system, which is a typical rule-based system, problems are solved by an inference engine referencing a rule base. This approach is characterized by the modularity and uniformity of rules, and natural knowledge representation. To the contrary, this approach has the problem of the difficulty of the creation and maintenance of rules because of reduction in efficiency due to increased rules as a result of treatment for exceptions and the intrinsic difficulty of creation of rules.

On the other hand, the example-based approach constructs a knowledge base based on expressions and cases that actually exist.

Methods for the example-based approach are further broadly divided into a general-purpose method and a specific-use method.

The general-purpose method intends to describe world knowledge based on actual examples, as typified by the dictionary construction approach of Japan Electronic Dictionary Research Institute (EDR). This method has the advantage of enabling non-specialists to construct a knowledge base having high volumes of knowledge by providing manpower because it does not depend on specific syntax rules for a method of dictionary description, etc., ensuring uniformity and accuracy for concepts having actual examples like a rule base. However, the fact that each concept generally has polysemy would provide no guarantee for accuracy and make detailed reflection of reality difficult without the same situation as at actual use of an actual example. Also, since the knowledge base becomes a very large one that contains hundreds of thousands of concepts or more, there is a problematic point that individual pieces of data are easy to input but it is very difficult to perform maintenance on the entire knowledge base.

As inventions relating to such thesaurus construction and generation, there are proposed "Knowledge Structure Creating Method" described in Japanese Published Unexamined Patent Application No. Hei 4-237332, "Thesaurus Generating Device" described in Japanese Published Unexamined Patent Application No. Hei 4-39769, and "Data Classification Device/Method, Data Classification Tree Generating Device/Method, Derivative Extracting Device/Method, Thesaurus Constructing Device/Method, and Data Processing Device" described in Japanese Published Unexamined Patent Application No. Hei 8-16620.

However, all of these inventions merely automate construction by introducing analysis techniques and only enjoy the merits of the example-base approach, providing no solution for the above-mentioned problem.

"Thesaurus Automatic Reorganization Device" described in Japanese Published Unexamined Patent Application No. Hei 3-276369, which describes the reconstruction of thesaurus, assumes thesauruses intended for specific uses as described below, such as program parts and electronic parts, providing no solution for the problem of polysemy in a general-purpose large-scale thesaurus.

A method for a specific use constructs and uses a small-scale knowledge base to meet the use. This method, although it has the advantage of providing easy maintenance while reflecting reality because of the specific-use characteristics, has a problem in that application to another use or reuse after several modifications requires as much time and effort as constructing a knowledge base from the beginning because situations eligible for use are limited and its existence is unknown to others.

As an invention relating to this use, there is proposed "Field-Classified Thesaurus Generating Device" described in Japanese Published Unexamined Patent Application No. Hei 9-6789. The invention relates to a technique which constructs field-classified thesauruses with inadequate words not relating to specific fields being removed based on general-purpose thesauruses from queries defining specific fields. However, the invention provides no solution for the problem of the difficulty of construction of general-purpose thesauruses, and further provides no effective means for reuse.

As described above, it has been so far difficult to construct a new thesaurus to meet user's purposes and uses from existing thesauruses.

SUMMARY OF THE INVENTION

The present invention has been made in consideration of the above-described conventional circumstances and its object is to generate a new thesaurus from existing thesauruses by operations in order to facilitate thesaurus expansion and maintenance.

Another object of the present invention is to generate a new thesaurus to meet user's purposes and uses from a plurality of thesauruses distributed on a network in order to facilitate thesaurus expansion and maintenance.

To achieve the above-mentioned objects, the present invention defines basic operations to synthesize thesauruses meeting the objects and generates a new thesaurus by repeating operations on pages making up the thesauruses.

The structure of a thesaurus relating to the present invention is as shown in FIG. 1. The thesaurus consists of pages P, P1, P2, P3, and so on, each of which has nodes N, N1, N2, N3, and so on, and arcs A, A1, A2, A3, and so on indicating a lower relation with a corresponding node, respectively, and is constituted by relating the pages. The nodes N, N1, N2, N3, and so on each are provided with a concept and assigned a unique identifier ID, and the arcs A, A1, A2, A3, and so on each contain the identifier ID of a node related subordinate thereto. Therefore, individual nodes (i.e., pages) in the thesaurus can be located by an identifier ID.

The present invention performs addition, product, Cartesian product, transposition, and other operations on thesauruses of the above structure in response to requests from a user, thereby generating a new thesaurus satisfying the objects.

For example, in a product operation, a matching concept is detected from lower nodes corresponding to arc identifiers among a plurality of inputted pages, a second page having the node of the matching concept is generated, and the second page is related with the arc of a new page, whereby a new thesaurus with the new page as the top node is generated.

As an embodiment of a product operation, a matching concept is detected from lower nodes corresponding to arc identifiers among a plurality of inputted pages, a second page having the node of a concept of a predetermined match level or higher is generated, and the second page is related with the arc of a new page, whereby a new thesaurus with the new page as the top node is generated.

In a Cartesian product operation, the arcs of a new page are generated with new identifiers assigned to arcs thereof by combining the arcs of a plurality of inputted pages, second pages generated based on lower nodes corresponding to the original arcs subjected to the combination processing are related with the newly generated arcs, and the nodes of concepts common among lower nodes of the original nodes subjected to the combination processing are related with the arcs of the second pages, whereby a new thesaurus with the new page as the top node is generated.

In a transposition operation, when a target node provided with a target concept is specified, a new thesaurus with the target node as the top node is generated by performing the operation so as to relate a node related subordinate to the target node with the target node and relate a node related superior to the target node with the node.

The present invention can be realized as a standalone system and is also applicable to a system in which thesauruses are distributed on a network, so that a new thesaurus can be generated based on a plurality of thesauruses distributed on a network. In this case, a thesaurus retrieval and synthesis device is connected through a network to a plurality of thesaurus management devices storing thesauruses to be retrieved, the thesaurus retrieval and synthesis device comprising: an input unit that accepts a request to define the thesauruses to be synthesized; a retrieval unit that retrieves pages matching identifiers corresponding to the request from the thesaurus management devices; and a synthesis unit that synthesizes the plurality of retrieved pages into a new page containing a node to which a new identifier is assigned, by performing an operation corresponding to the request thereon, whereby a new thesaurus with the new page as the top node is generated by performing the above operation by the synthesis unit.

BRIEF DESCRIPTION OF THE DRAWINGS

FIG. 10 shows an example of the result of thesaurus Cartesian product.

DESCRIPTION OF THE REFERENCE NUMERALS

1 . . . Network,
2 . . . External thesaurus,
3 . . . Thesaurus retrieval and synthesis device,
4 . . . Thesaurus search server,
5 . . . Input unit,
6 . . . Output unit,
21 . . . Thesaurus DB unit,
22 . . . Thesaurus structure extracting unit,
23 . . . Thesaurus specification DB unit,
24 . . . Thesaurus disclosing unit,
31 . . . Query processing unit,
32 . . . Thesaurus retrieval unit,
33 . . . Thesaurus synthesis unit,
34 . . . Thesaurus memory unit,
35 . . . Real data coupling unit

DESCRIPTION OF THE PREFERRED EMBODIMENTS

A thesaurus synthesis and retrieval system according to one embodiment of the present invention will be described with reference to the accompanying drawings.

Figure 2:
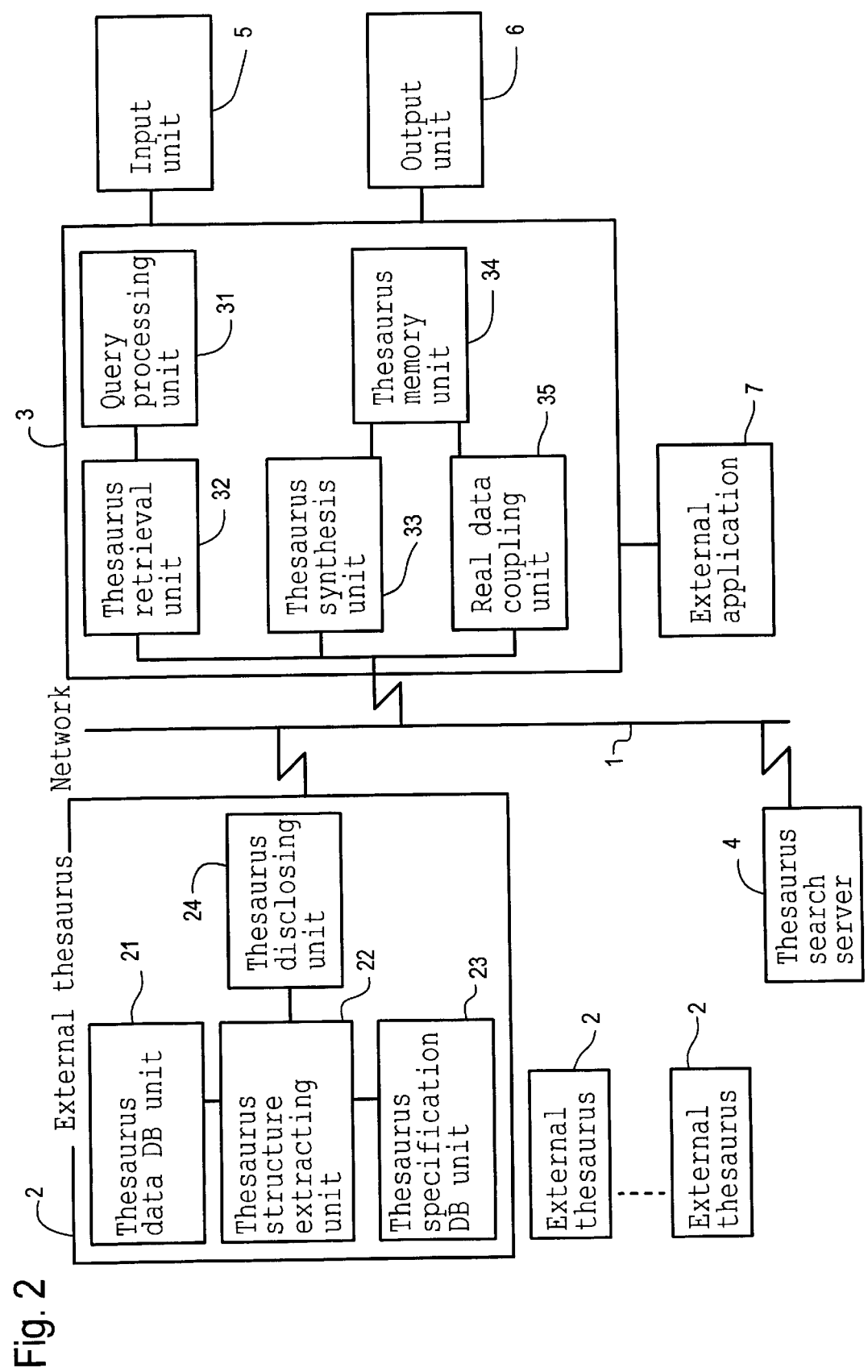
FIG. 2 shows the configuration of a thesaurus retrieval and synthesis system according to one embodiment of the present invention.

FIG. 2 shows a rough configuration of a thesaurus synthesis and retrieval system according to this embodiment, in which a plurality of thesauruses (external thesauruses 2) are distributed on a network 1.

n number of external thesauruses 2 exist on the network and each external thesaurus 2 is constituted as a thesaurus management device that comprises a thesaurus data DB unit 21, a thesaurus structure extracting unit 22, a thesaurus specification DB unit 23, and a thesaurus disclosing unit 24.

Further, each external thesaurus 2 is connected to a thesaurus retrieval and synthesis device 3 and a thesaurus retrieval server 4 through the network 1, and the thesaurus retrieval and synthesis device 3 comprises a query processing unit 31, a thesaurus retrieval unit 32, a thesaurus synthesis unit 33, a thesaurus memory unit 34, and a real data coupling unit 35. To the thesaurus retrieval and synthesis device 3 are connected an input unit 5, an output unit 6, and an external application unit 7.

The external thesauruses 2 each store thesauruses created and maintained according to specific uses, such as manufacturer's product information and journal articles, and classification by specialist, and the thesaurus DB unit 21 collectively stores the real data of a thesaurus, that is, data making up the thesaurus, such as rank relations as a link structure conforming to the entire tree, concepts, and real word expressions.

The thesaurus structure extracting unit 22 extracts information necessary to use the thesaurus at the outside from data stored in the thesaurus DB unit 21.

The thesaurus specification DB unit 23 stores the specification of the thesaurus separated from the real data on the basis of information extracted in the thesaurus structure extracting unit 22 and makes output in accordance with a request from the thesaurus retrieval and synthesis device 3.

The thesaurus disclosing unit 24 discloses specification information stored in the thesaurus specification DB unit 23 so as to make it available to the outside, and returns specifications and real data corresponding thereto in response to a request.

The network 1 that connects these external thesauruses 2 to the thesaurus retrieval and synthesis device 3 can be the Internet or a closed network such as an office LAN. This embodiment will be described on the assumption that it is realized on http (Hyper Text Transfer Protocol) used as an existing technology.

The thesaurus retrieval and synthesis device 3 processes requests from the input unit 5 in the query processing unit 31 and passes them to the thesaurus retrieval unit 32. The thesaurus retrieval unit 32 retrieves external thesauruses 2 through the network 1 and the thesaurus synthesis unit 33 synthesizes a new thesaurus from the thesauruses obtained as a result of the retrieval. The new, synthesized thesaurus is stored in the thesaurus memory unit 34 and outputted to the output unit 6.

A thesaurus search server 4 stores the specification information of the external thesauruses 2 on the basis of information disclosed in the thesaurus disclosing unit 24.

An external application 7 performs classification, similarity retrieval, and other operations by use of an obtained thesaurus. Since a virtual thesaurus synthesized from only specifications is generated in this embodiment, coupling with real data is dynamically performed through the real data coupling unit 35 in actual use.

The present invention assumes also the configuration in which coupling with real data is statically performed during synthesis; in that case, the real data coupling unit 35 is unnecessary.

Thereafter, an example of retrieval and synthesis of a product information thesaurus will be described as an example of operation in this embodiment.

Generally, the structure of a thesaurus consists of rank relations between concepts or concrete matters and information representing actual concepts and concrete matters pertaining to it. Usually, names (labels) and IDs (identifiers) are assigned to concepts and concrete matters.

Figure 3:
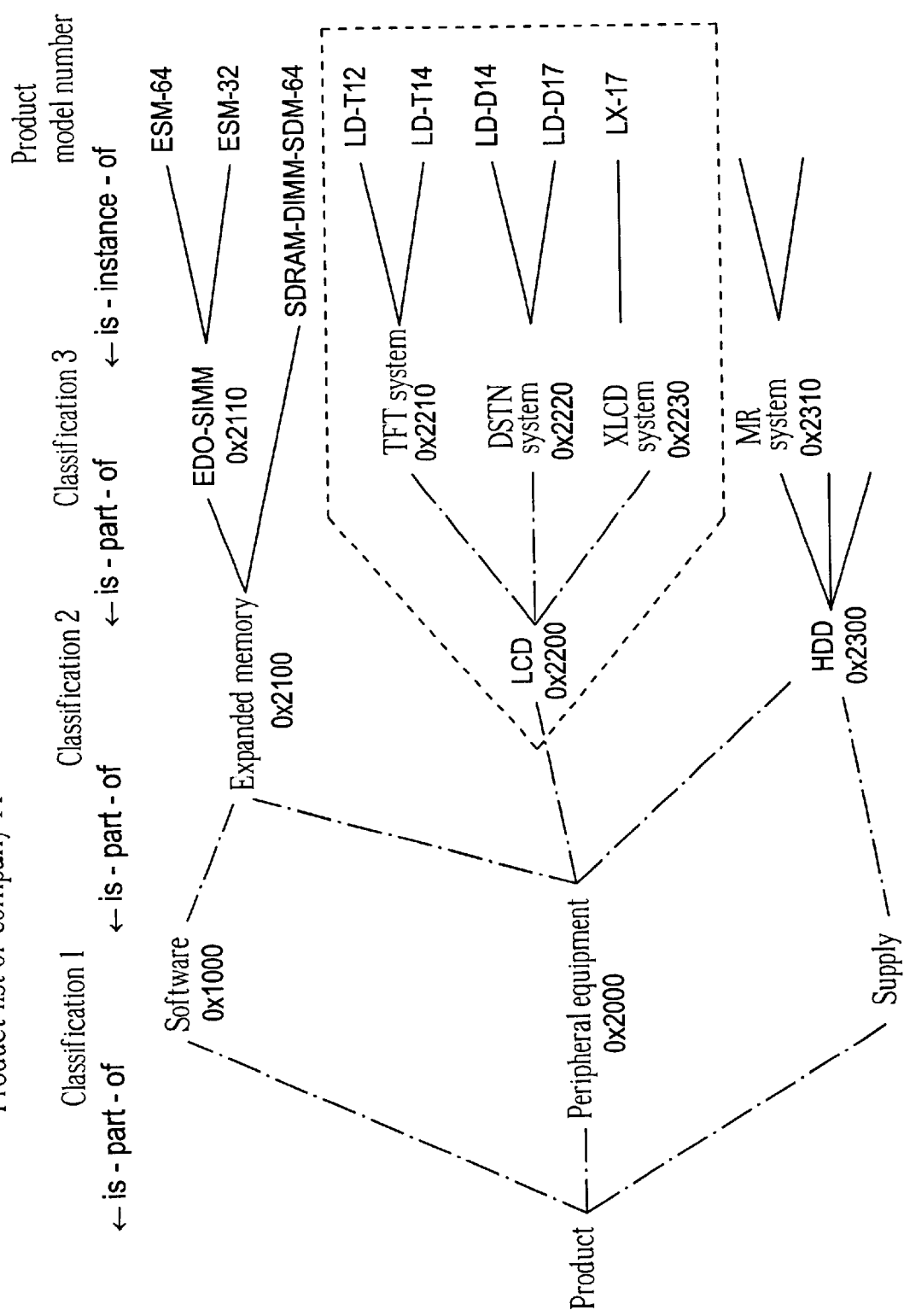
FIG. 3 shows a concrete example of a thesaurus.

FIG. 3 shows a list of products of a manufacturer; specifically the products are divided into a first class including software, peripheral equipment, and supplies, and the peripheral equipment, e.g., of them is further divided into a second class including expansion memory, LCD, and HDD, and the LCD is further subdivided into the TFT system, DSTN system, and XLCD system by drive system. Furthermore, to each subclass are linked names such as LD-T12 and LD-T14 as actual product model numbers.

Figure 1:
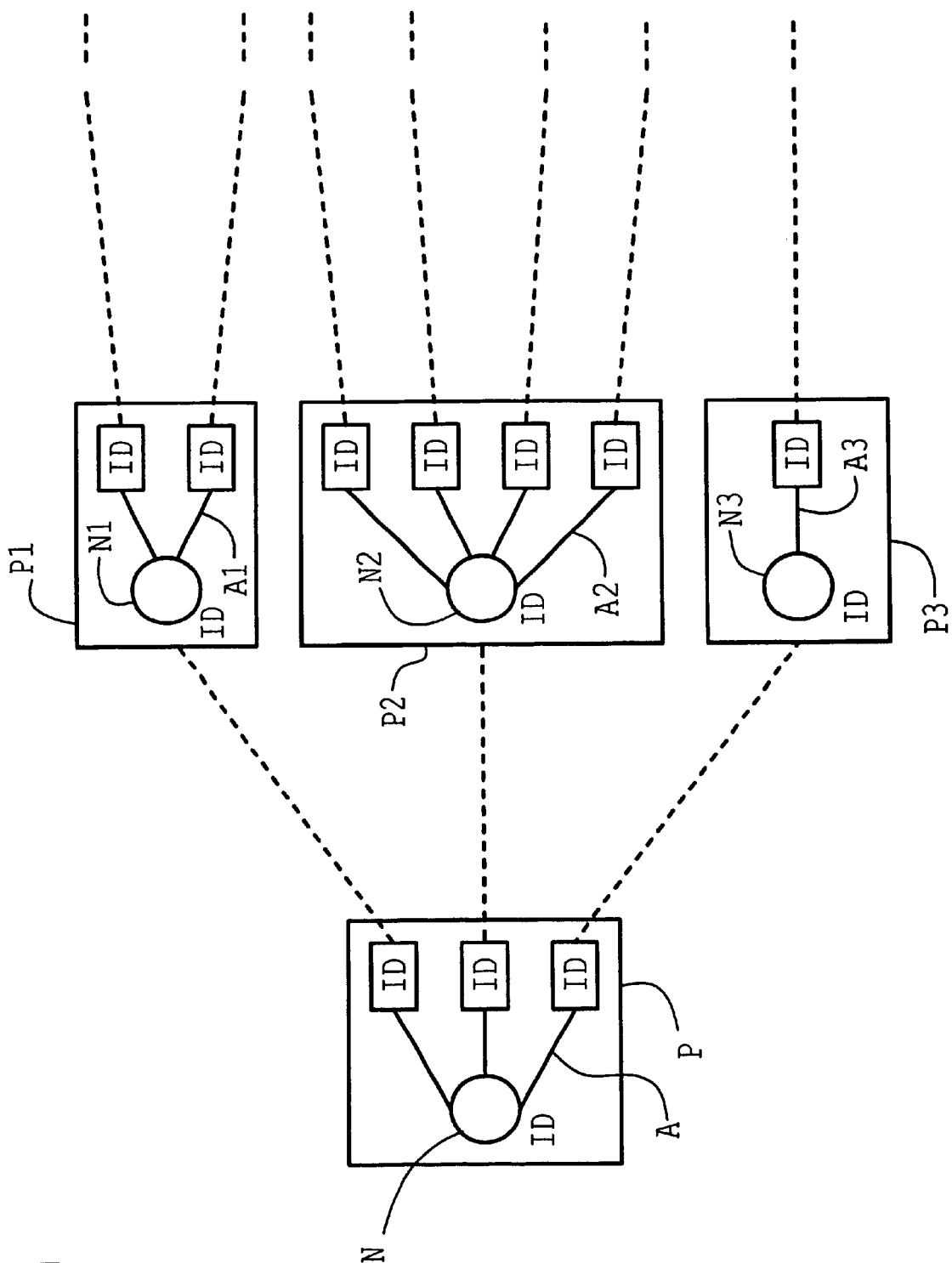
FIG. 1 is a conceptual diagram for explaining the structure of a thesaurus.

The structure of the above product list can be seen as defining rank relations of product classes and product numbers and can be said as a sort of a thesaurus. More specifically, the nodes of each product class indicate the names of concepts, product model numbers indicate the names of concrete matters, links between them serve as arcs indicating a rank relation, and unique identifiers (ID) such as 0x1000 and 0x2200 are assigned to the nodes. This thesaurus is of such a structure that a page is allocated to each node as a unit as shown in FIG. 1 and rank relations are established among the nodes.

In this embodiment, data containing all the above items is stored in the thesaurus data DB unit 21 of each external thesaurus 2. Although a specific data structure can be used as a storage format, an example of storing data in the HTML (Hyper Text Markup Language) format commonly used for data available on the Internet is shown here. The use of HTML is effective because the structure of thesauruses is highly similar to that of hyper text in that the relations among data are expressed as a link structure on the basis of relations.

Part of a product information structure shown in FIG. 3 is expressed by HTML as shown below.

<HTML>
<HEAD>
<META HTTP-EQUIV="Content-Type" CONTENT="text/html">
<META NAME="Description" CONTENT="THLBL=a list of products by company A (October, 1997)">
<TITLE>LCD</TITLE>
</HEAD>
<BODY>
<A NAME="is-part-of" /A>
Page of LCD
<A NAME="attribute">drive system </A>
<UL><LI><A HREF="TFT.html#is-part-of">TFT system <A></LI></UL>

The TFT system is characterized by a high response speed and wide visibility angles. <UL><LI><A HREF="DSTN.html#is-part-of">DSTN system </A></LI></UL>

The DSTN system is characterized by a reasonable price. <UL><LI><A HREF="XLCD.html#is-part-of">XLCD system </A></LI></UL>

The XLCD system has realized a bright, large screen by our original technology. <P><A HREF="Perif.html">Return to the page of peripheral equipment </A>.
</BODY>
</HTML>

Such a file is stored in the following URL, e.g., in the thesaurus data DB unit 21.

http://www.a
sya.co.jp/export/thesaurus/products/periferal/LCD.ht
ml

This embodiment provides a path structure with a name reflecting the hierarchical structure of a thesaurus.

Structure information used as a key is extracted from the thesaurus structure extracting unit 22. The following items of information are extracted. A brief description of these will be made based on the above HTML.

Thesaurus name:

A label representing the entire thesaurus is stored in each HTML. A description of "<META NAME="Description" CONTENT=" THLBL= a list of products by company A (October, 1997)">" is made to indicate that the label is "a list of products by company A (October, 1997)".

Concept name /ID:

A label or identifier representing the concept of each node is stored in each node. Here, "LCD" is specified in the <TITLE> tag of a node to indicate the concept of the node.

Relation:

A rank relation between nodes is described using an anchor and a marker, here. That is, for "TFT system" and "DSTN system" in relation of part of "LCD", a lower relation with a link end is described using the marker "#is-part-of" by anchor. On the other hand, since "LCD" itself is in relation of part of "peripheral equipment", a higher relation with "peripheral equipment" is described by anchor and a link from "peripheral equipment" is stored by the marker "#is-part-of" in the beginning of the <BODY> tag. Additionally, a relation of "concept-concrete matter", for example, is described by the marker "#is-a".

Furthermore, an attribute can be afforded to a relation. Here, attribute information "drive system" is specified by the marker "attribute".

Concrete matter name:

A label representing a concrete matter is specified. Although labels of this type are not described in the above example of HTML, "LD-T14", "LD-D14", etc. are stored in the bottom node. A distinction from a concept name is made by the marker "#is-a" as described above.

In this way, atomic information representing the structure of a thesaurus can be described sufficiently by HTML and the structure of the entire thesaurus is expressed by combining HTML files.

A method of extracting the above data can, if data is thus expressed by HTML, be easily realized by using parser on the basis of tags.

The above structure information extracted by the thesaurus structure extracting unit 22 is stored in the thesaurus specification DB unit 23.

The thesaurus data DB unit 21 and the thesaurus specification DB unit 23 correspond to the text real data and keyword indexes of a normal text information database (text DB), respectively. The difference from a text DB is that because a thesaurus has a structure, the structure is also contained in key information.

The thesaurus disclosing unit 24 discloses obtained key information to the outside as specifications and, in response to a query from the outside, sends real data corresponding to the specifications from the thesaurus data DB unit 21.

Various disclosing methods are possible; as one effective method, here, a description will be made of an approach similar to text information search services on the Internet.

Recently, automatic collection and indexing by use of techniques called crawler or spider are rapidly developing. Since these techniques are applicable to data described by HTML on http despite its contents, information publicized on the Internet can be automatically collected by the techniques described in "Special Edition: Archive Creation and Retrieval" on and after Page 23 of the 1997, Aug. issue of Internetworking (by ASCII CORPORATION). This is realized in such a way that a crawler program sent by the thesaurus server 4 sequentially scans disclosed thesauruses distributed on the Internet.

In the above example, descriptively, one HTML corresponds to one layer of a thesaurus. However, depending on use, all layers may be described collectively in one HTML or data entities and layer relations can be stored in the format of a file and a directory.

Next, the operation of the thesaurus retrieval and synthesis device 3 will be described.

By a user affording the request specifications of a desired thesaurus from the input unit 5, the thesaurus retrieval and synthesis device 3 starts the operation described below. Although the request is afforded by defining a dedicated language or using a graphical interface, a method by use of a natural language will be described here as a method friendly with general users.

For example, the request is expressed as "input signals and typical drive systems on a liquid crystal display".

When such a request t is inputted, the query processing unit 31 analyzes the request and generates a query of a format suitable for an input to the thesaurus retrieval unit 32 and the thesaurus synthesis unit 33.

Here, as a concrete solution method, a method described below will be used as described in "keyword extracting device" in Japanese Published Unexamined Patent Application No. Hei 7-319885 as a technique for analyzing a plurality of concepts and the relations among the concepts.

That is, the relations among concepts are analyzed based on specific expressions (1) and (2) suitable for a description of rank relations.

(1) Y which is X: a concrete matter of the concept of X (Y is-a X)

(2) Y on X: a concept Y having the higher concept of X (Y is-part-of X)

Further, the specific expressions (3) to (6) below, for example, will be used to describe thesaurus synthesis processing (operation). This can be easily realized by specific pattern match. Details of synthesis processing will be given later.

(3) Typical X, common X: logical product of thesauruses retrieved on X (thesaurus product)

(4) General Y, all Ys: logical addition of thesauruses retrieved on Y (thesaurus addition)

(5) X and Y: Cartesian product of thesauruses retrieved on X and Y (thesaurus Cartesian product)

(6) Transposition of X and Y: thesaurus transposition on X and Y (or thesaurus shrinking)

Figure 4:
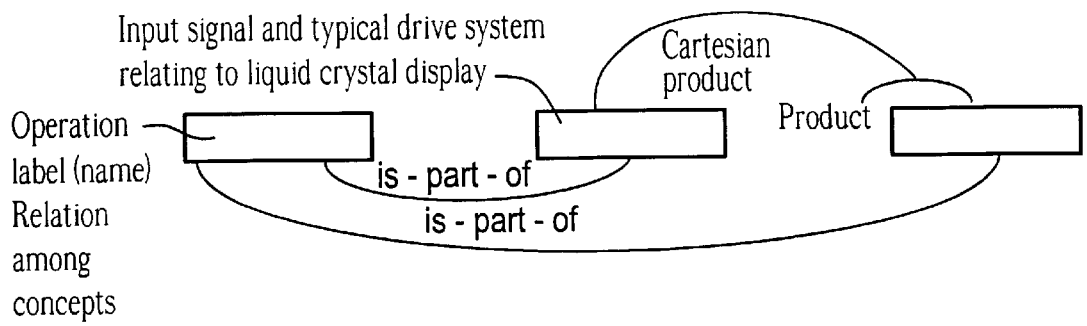
FIG. 4 is a diagram for explaining one example of the result of analyzing a request.

As a result, a request expressed as "input signals and typical drive systems on a liquid crystal display" is analyzed as shown in FIG. 4.

That is, as relations among concepts, "input signal" and "drive system" both have the relation of "is-part-of" with "liquid crystal display", and as synthesis processing (operation), the result of a product operation on "drive system" and "typical" is further subjected to a Cartesian product operation With "input signal".

Based on such an analysis result, thesaurus retrieval and synthesis processing are performed.

Keys usable in thesaurus retrieval basically consist of a combination of items extracted by the thesaurus structure extracting unit 22 described previously. That is, 1) Retrieval from classification name, e.g., "product list"

By specifying a classification name, only specific thesauruses are selected even if nodes having the same concept exist, for example.

2) Retrieval from concept name, e.g., "liquid crystal monitor", "TFT system"

By specifying concept names, nodes (pages) of a target thesaurus are limited so that the thesaurus contains a specified concept and lower concepts or all specified concepts, for example.

3) Retrieval from concrete name, e.g., "LD-T14", "MT-V14", "L400X"

By specifying a list of concrete names, common concepts containing all the concrete names, for example, are retrieved.

4) Retrieval using relations, e.g., "liquid crystal monitor of TFT system" (=TFT system, is-part-of, liquid crystal monitor)

A plurality of concepts and relations among them are specified and a partial structure of a thesaurus satisfying it is retrieved.

The retrieval in 1) to 3) above can be realized by the same technique as that of known text based information retrieval. That is, the retrieval can be easily performed by similarity retrieval or the like using a character string base or expansion dictionary.

Retrieval in 4) can be performed using a known method, as described in "Hierarchical item retrieval device" in Japanese Published Unexamined Patent Application No. Hei 8-235194, for example.

As a result of the above analysis, retrieval requests "input, is-part-of, liquid crystal display" and "drive system, is-part-of, liquid crystal display" are generated. The retrieval requests are given to the thesaurus search server 4 through the network 1 and, as information necessary to synthesize thesauruses, a plurality of partial thesaurus structures satisfying the conditions are returned to the thesaurus retrieval and synthesis device 3. Here, information returned is a pointer (URL in this embodiment) to the top node satisfying the retrieval requests in each thesaurus. This can be explained as follows for the retrieval requests: since partial thesauruses having concepts of attributes of "input signal" or "drive system" as lower concepts of "liquid crystal display" are requested, partial thesauruses returned are comprised of "liquid crystal display" concept and lower concepts in each of thesauruses matching the conditions.

As an actual example described below, suppose that the following results are returned for each condition.

For "drive system, is-part-of, liquid crystal display"

Figure 5:
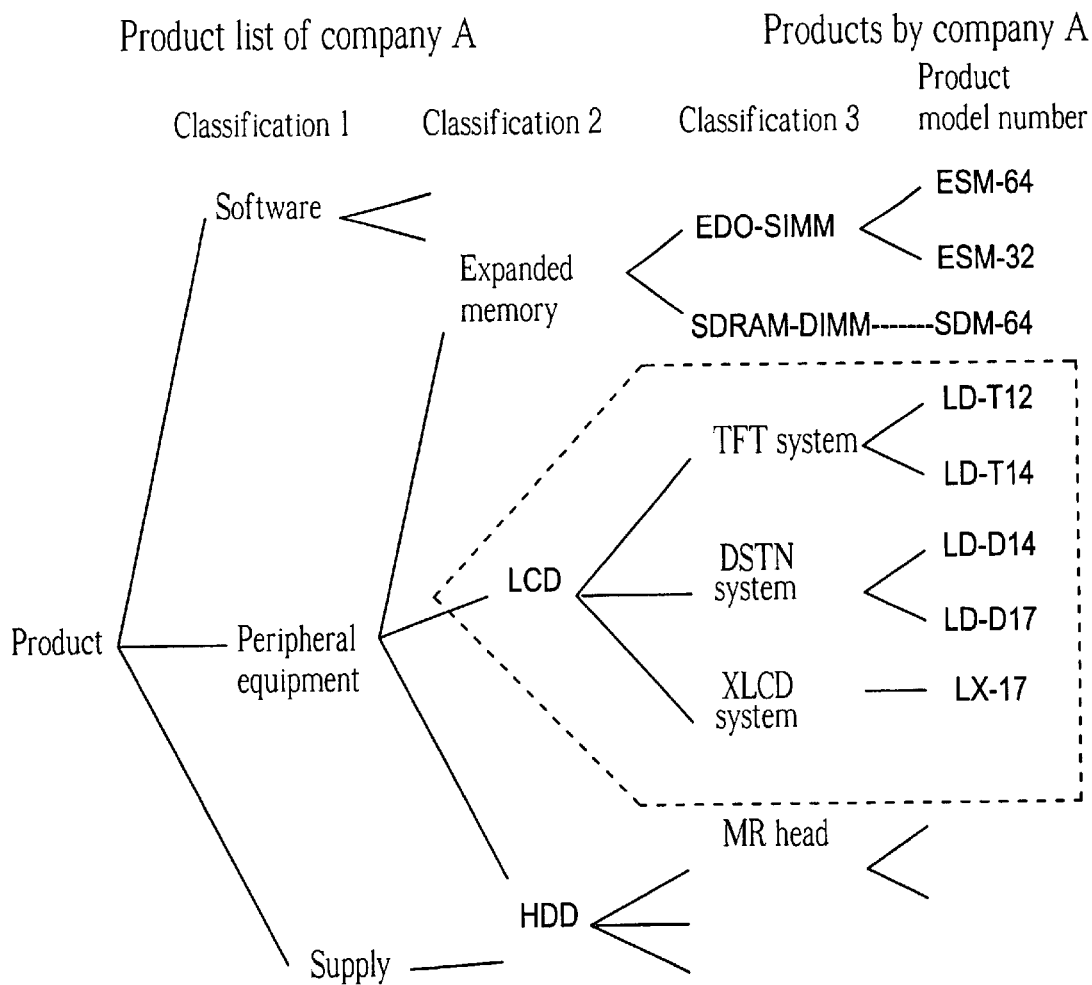
FIG. 5 shows a concrete example of an input thesaurus.
Figure 6:
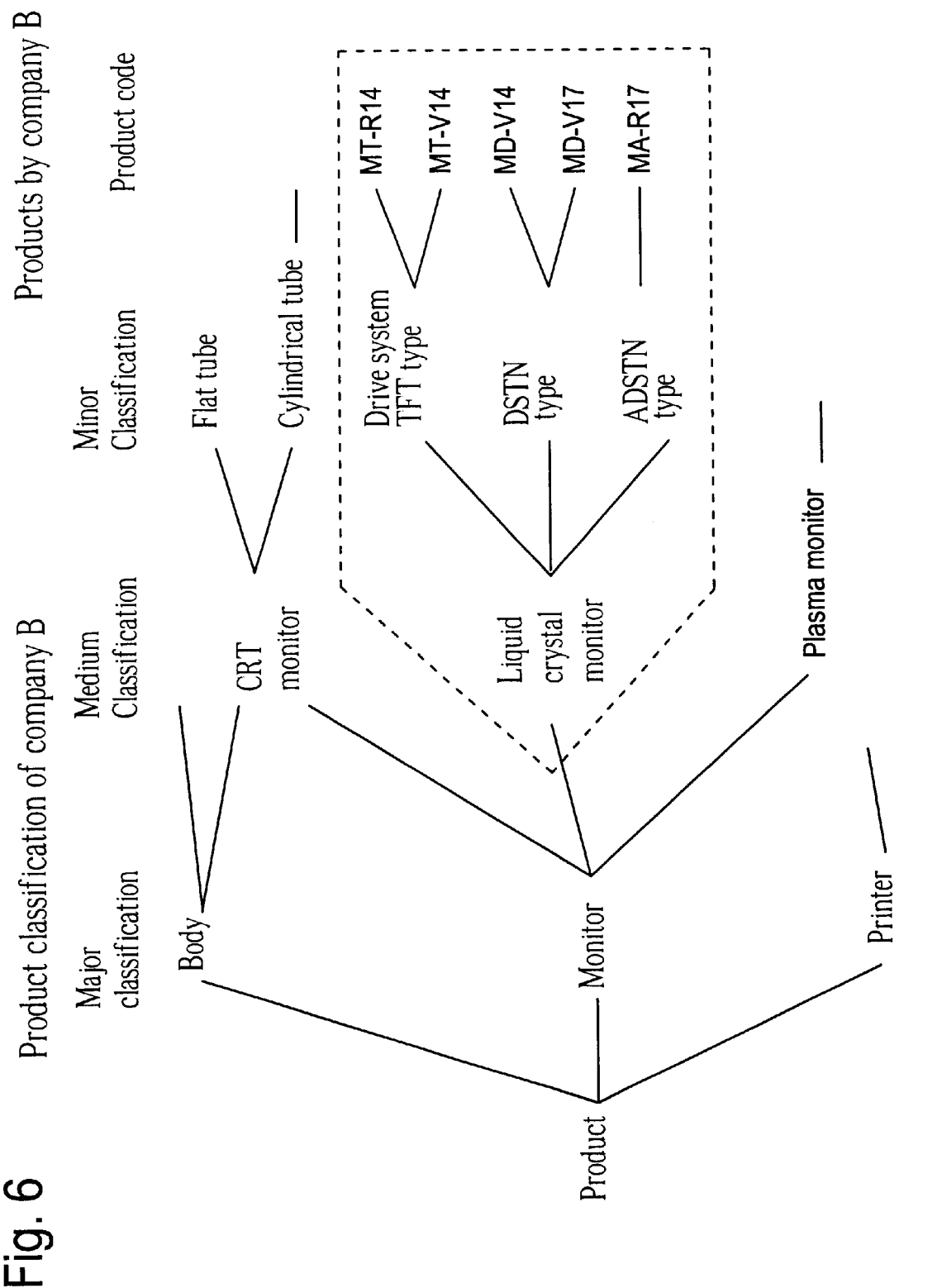
FIG. 6 shows a concrete example of an input thesaurus.

"LCD" and lower concepts, enclosed by a dotted line in a product list of company A (FIG. 5)

http://www.a-sya.co.jp/export/thesaurus/products/periferal/LCD.html,

"liquid crystal monitor" and lower concepts, enclosed by a dotted line in product classification of company B (FIG. 6)

http://www.b-inc.co.jp/export/thesaurus/shounin/monitor/LCmon.html,

For "input signal, is-part-of, liquid crystal display"

Figure 7:
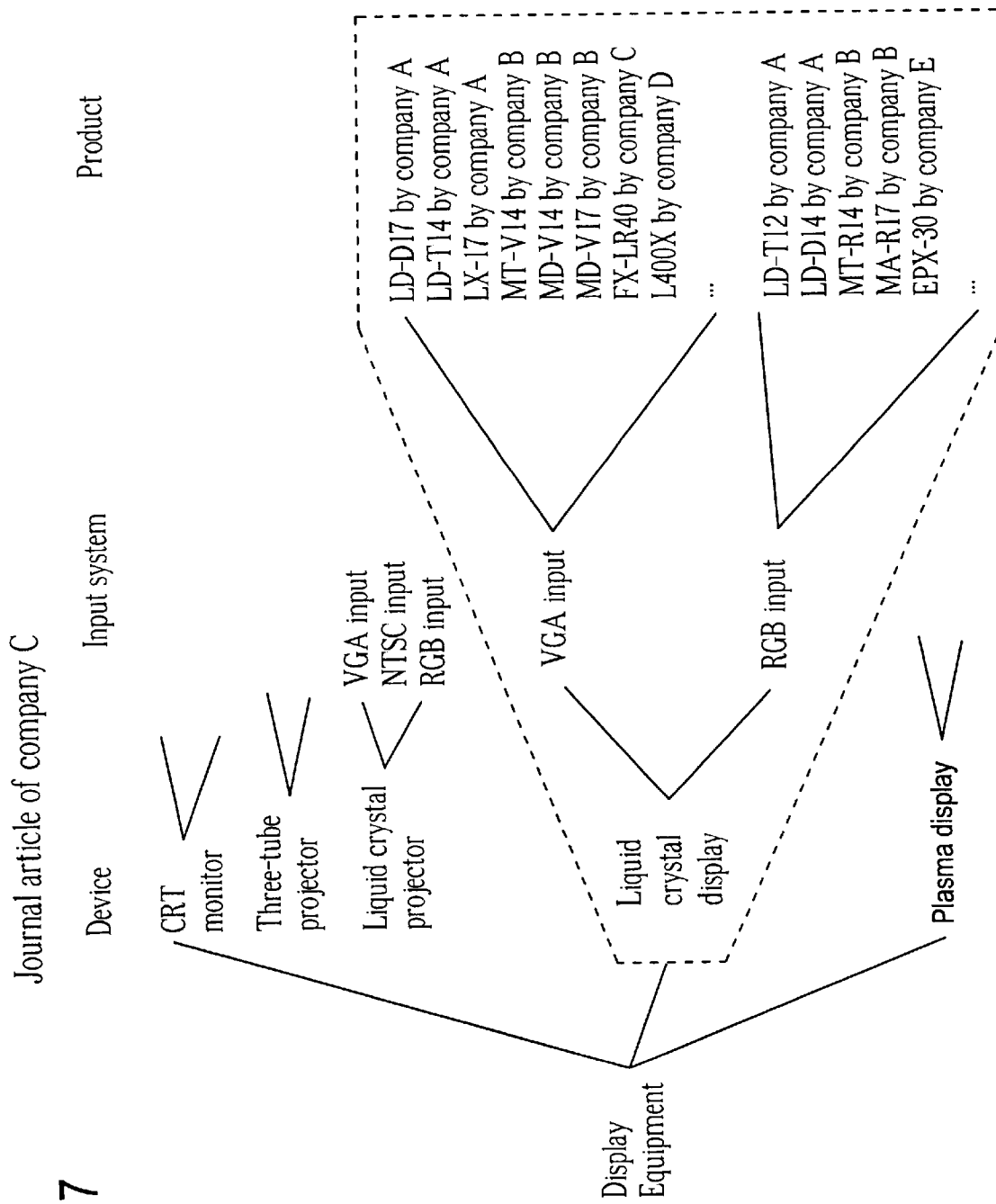
FIG. 7 shows a concrete example of an input thesaurus.

"liquid crystal display" and lower concepts in journal article "Display Equipment Issue" of company C (FIG. 7)

http://www.c-mag.co.jp/export/thesaurus/dispdev/LCD.html,

Next, according to the result of analyzing user-specified request specifications, the thesaurus synthesis unit 33 synthesizes partial thesauruses retrieved as "drive system" of "liquid crystal display" by subjecting them to thesaurus product and further synthesizes the result and a partial thesaurus on "input system" of "liquid crystal display" by subjecting them to thesaurus Cartesian product.

The following basic operations can be defined as synthesis processing.

Figure 8:
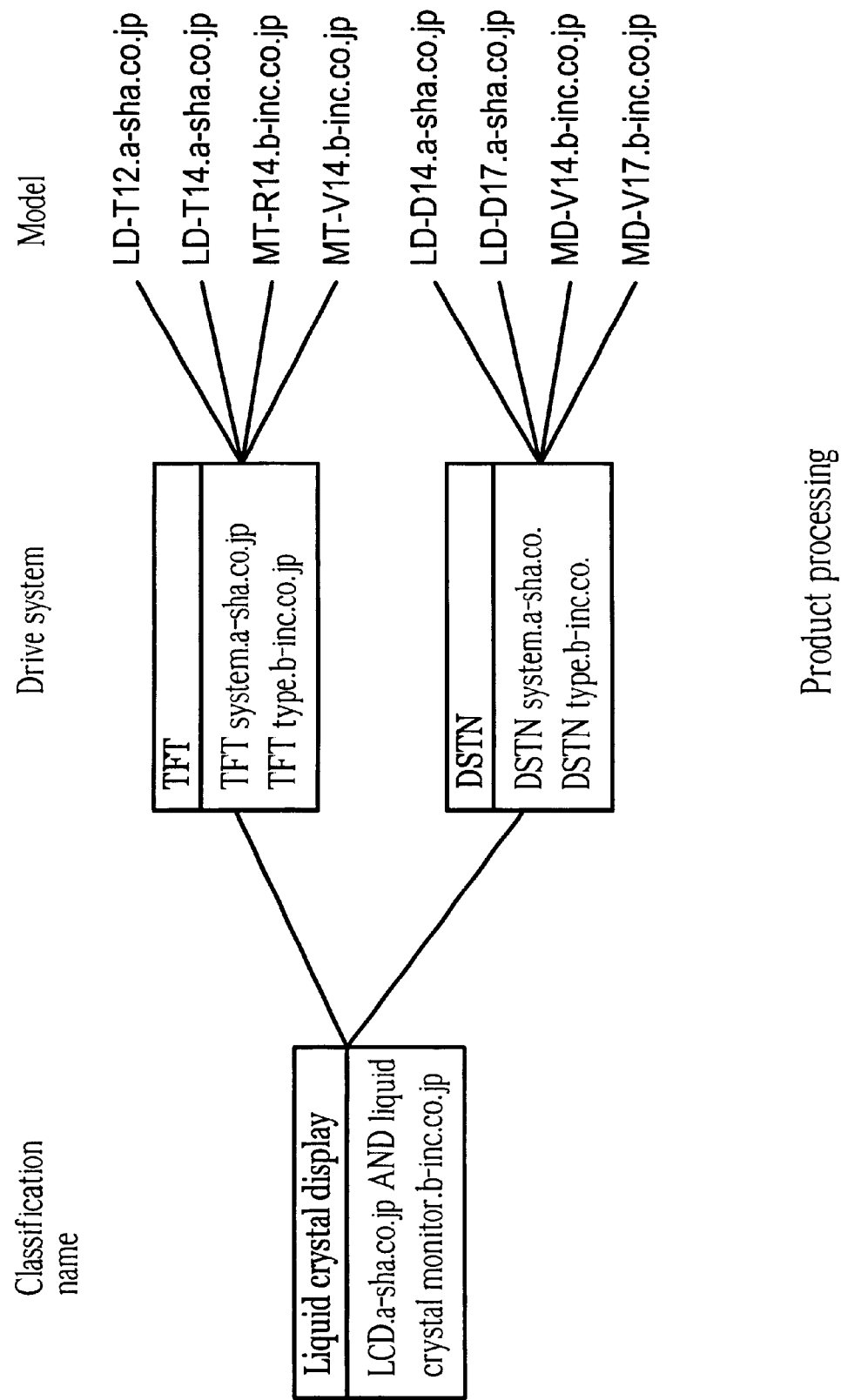
FIG. 8 shows an example of the result of thesaurus product.

Thesaurus product: Only links contained in common nodes among target thesauruses are left (FIG. 8).

Figure 9:
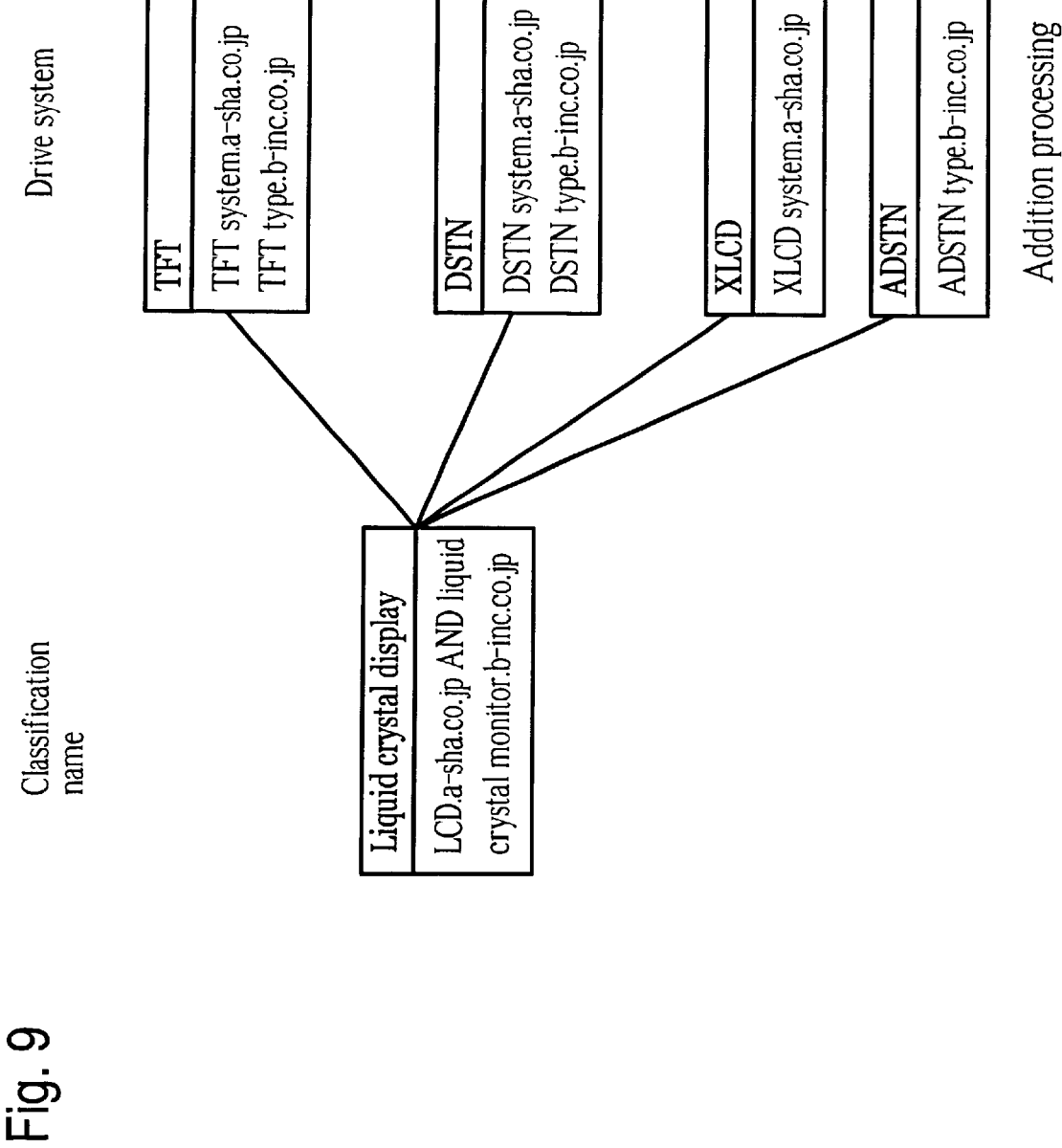
FIG. 9 shows an example of the result of thesaurus addition.

Thesaurus addition: All nodes among target thesauruses are listed (FIG. 9).

Thesaurus Cartesian product: Nodes among target thesauruses are subjected to Cartesian product (FIG. 10).

Figure 11A:
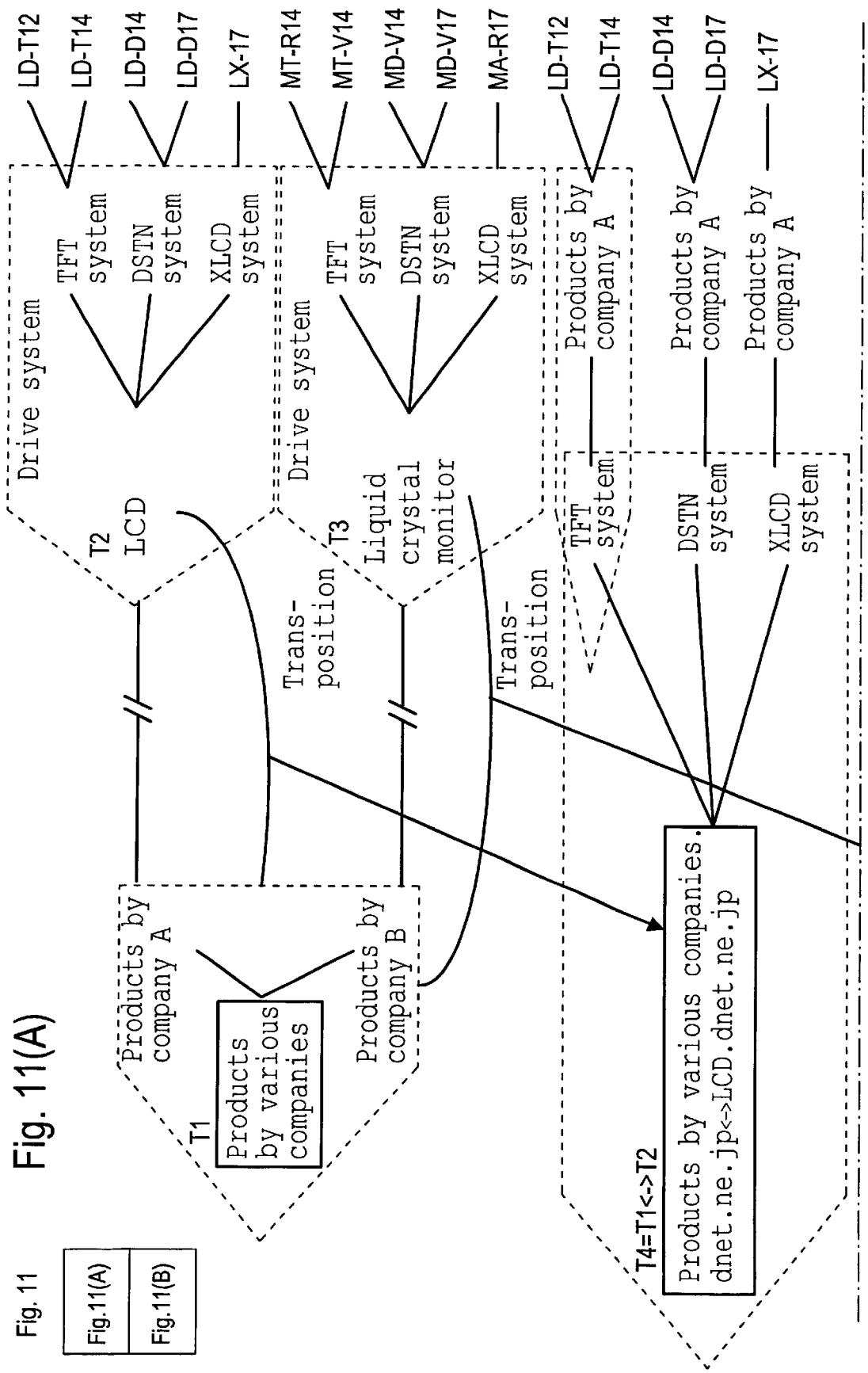
FIG. 11 shows an example of the result of thesaurus shrinking.
Figure 11B:
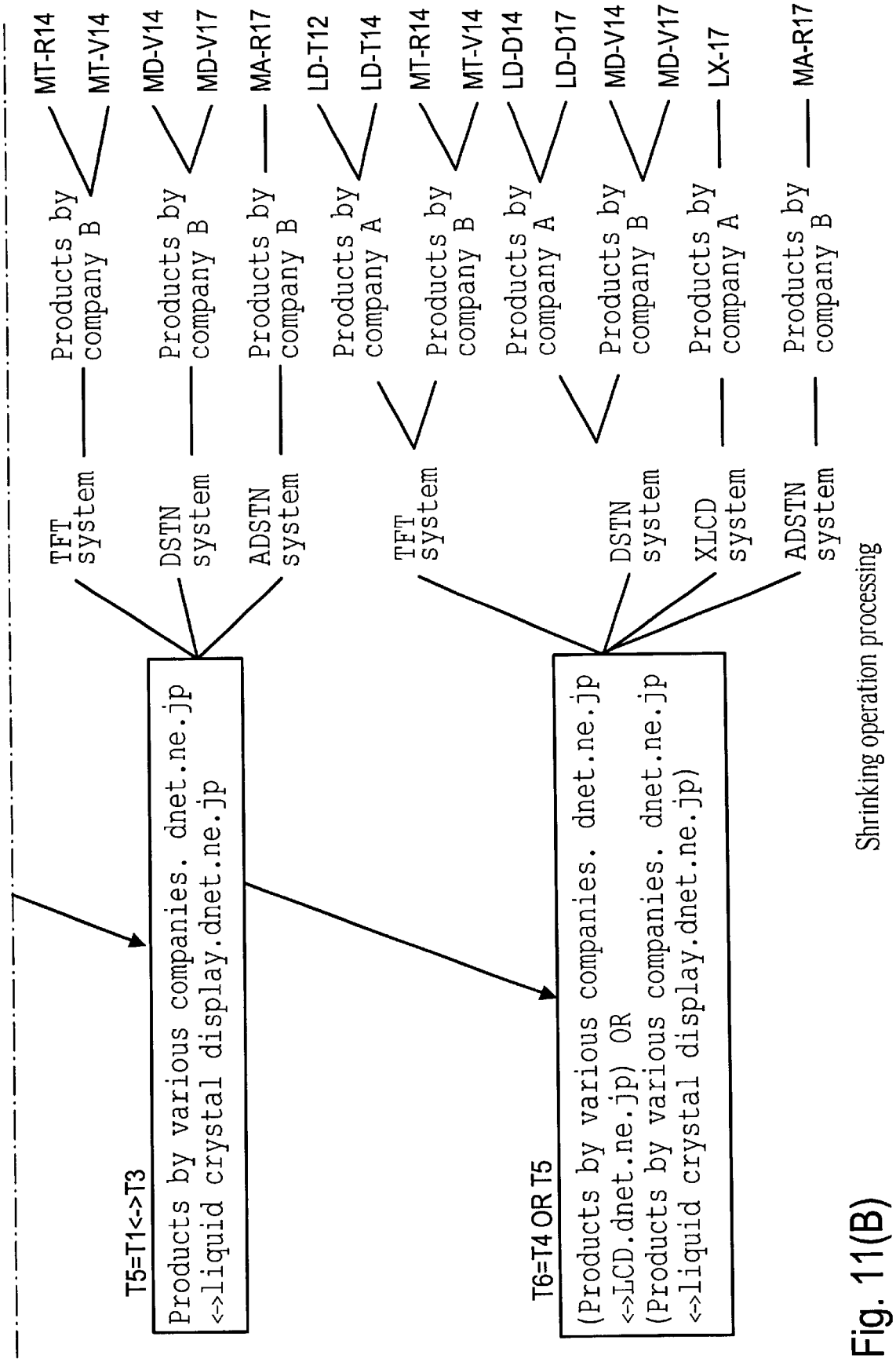

Thesaurus shrinking: Rank relations in target thesauruses are transposed and unnecessary links are shrunken (can be regarded as an addition operation on transposed thesauruses) (FIG. 11).

Figure 12:
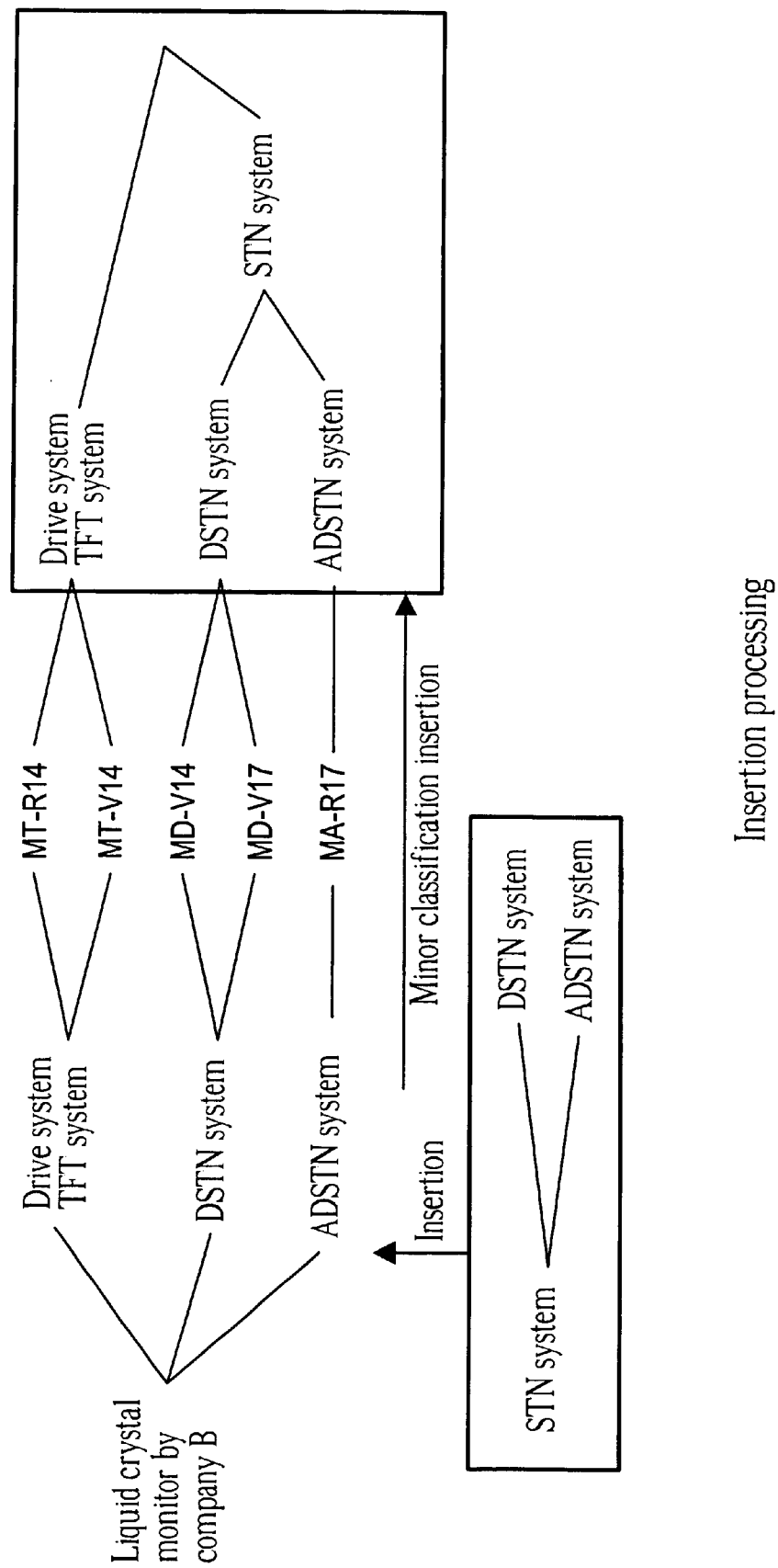
FIG. 12 shows an example of the result of thesaurus insertion.

Thesaurus insertion: One of target thesauruses is inserted into another (FIG. 12).

FIG. 8 shows one example of the result of thesaurus product subjected to the thesaurus enclosed by the dotted line in FIG. 5 and the thesaurus enclosed by the dotted line in FIG. 6.

As apparent from FIG. 8, a new thesaurus generated by the thesaurus product consists of three levels of nodes: the top node, which is constituted by "liquid crystal display" synthesized from the top nodes "LCD" and "liquid crystal monitor" of the input thesauruses; the second nodes, which are constituted by nodes "TFT" and "DSTN" of common concepts of the second nodes "TFT system", "DSTN system", and "XLCD system" of one input thesaurus (FIG. 5) and the second nodes "TFT type", "DSTN type", and "ADSTN type" of another input thesaurus (FIG. 6); and the bottom nodes, which are constituted by nodes related with the original second nodes that have become common concept nodes, of the bottom nodes (leaves) of one input thesaurus and another input thesaurus.

FIG. 9 shows one example of the result of thesaurus addition subjected to the thesaurus enclosed by the dotted line in FIG. 5 and the thesaurus enclosed by the dotted line in FIG. 6.

As apparent from FIG. 9, a new thesaurus generated by the thesaurus addition consists of three levels of nodes: the top node, which is constituted by "liquid crystal display" synthesized from the top nodes "LCD" and "liquid crystal monitor" of the input thesauruses; the second nodes, which are constituted by nodes "TFT", "DSTN", "XLCD", and "ADTSN" representing all concepts of the second nodes "TFT system", "DSTN system", and "XLCD system" of one input thesaurus (FIG. 5) and the second nodes "TFT type", "DSTN type", and "ADSTN type" of another input thesaurus (FIG. 6); and the bottom nodes, which are constituted by nodes related with the original second nodes that have newly become the second nodes, of the bottom nodes (leaves) of one input thesaurus and another input thesaurus.

FIG. 10 shows one example of the result of thesaurus Cartesian product subjected to the result of thesaurus product shown in FIG. 8 and the concept nodes "VGA input" and "RGB input".

As apparent from FIG. 10, a new thesaurus generated by the thesaurus Cartesian product consists of three levels of nodes: the top node, which is constituted by "liquid crystal display"; the second nodes, which are constituted by nodes "VGA input AND TFT", "VGA input AND DSTN", and "RGB input AND TFT", and "RGB input AND DSTN" representing the concepts of all combinations of the second nodes "TFT" and "DSTN" of the result of thesaurus product, and "VGA input"; and the bottom nodes, which are constituted by nodes related with the original second nodes that have newly become the second nodes, of the bottom nodes (leaves) of the result of thesaurus product.

FIG. 11 shows one example of the result of thesaurus shrinking resulting from thesaurus addition subjected to new thesauruses T4 and T5 obtained by transposing "LCD" and "liquid crystal monitor" within an input thesaurus T1 as target nodes.

As apparent from FIG. 10, the thesaurus T4 is produced by transposing a higher node "product by company A" and lower nodes "TFT system", "DSTN system", and "XLCD system" of "LCD" node, the thesaurus T5 is produced by transposing a higher node "product by company B" and lower nodes "TFT system", "DSTN system", and "ADSTN system" of "liquid crystal monitor" node, and the result of thesaurus shrinking is obtained by subjecting thesaurus addition to these thesauruses T4 and T5 as described above.

FIG. 12 shows one example of the result of inserting another thesaurus with "STN system" related with lower nodes "DSTN system" and "ADSTN system" into an original thesaurus with "liquid crystal monitor by company B" as the top node.

As apparent from FIG. 12, a thesaurus is inserted in a manner that relates node concepts and relates another thesaurus further subordinate to an original thesaurus.

Different types of synthesis processing corresponding to actual queries described above (requests) are performed in the thesaurus synthesis unit 33. Each kind of the synthesis processing will be described with reference to a flowchart.

With respect to "drive system, is-part-of, liquid crystal display" indicating the drive systems of liquid crystal display, since "typical", an expression specifying synthesis operation by thesaurus product, is specified for a product list (FIG. 5) by company A and product classification (FIG. 6) of company B obtained as a result of retrieval, a synthesis operation is performed to leave only links contained in common nodes among target thesauruses. As a result, the links of only the two methods TFT and DSTN contained in common are left as shown in FIG. 8.

In this case, since other thesauruses are synthesized, some standard method is required for naming rules. Here, a domain name is used as a unique identifier for solution. That is, by putting a domain name of a relevant thesaurus after the concept label of each node, unique names are always assured on a distributed network.

Figure 13B:
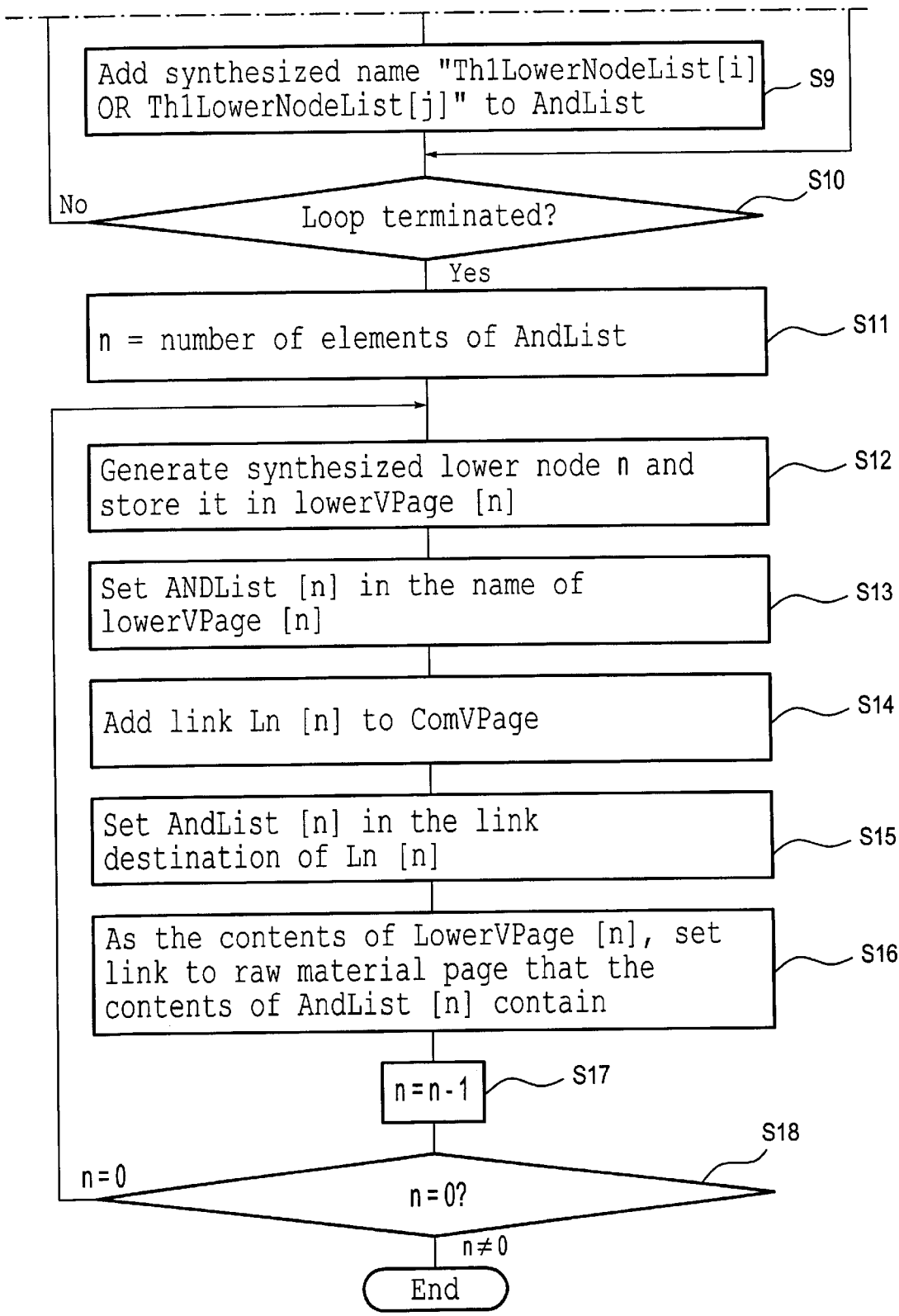
FIG. 13 is a flowchart showing an example of a procedure of thesaurus product processing.

Synthesis processing by the above product operation will be described in more detail using the flowchart shown in FIG. 13. Although thesaurus product between two thesauruses is described here, the operation among three or more thesauruses can be replaced by that between two thesauruses.

First, two retrieved thesauruses (input thesaurus 1 and input thesaurus 2) are inputted and the respective top node names "Th1TopNode" and "Th2TopNode" of the input thesauruses are extracted (steps S1 and S2). A virtual page ComVPage of the top node of a new synthesized thesaurus is generated (step S3) and, as the name of the page, "Th1TopNode AND Th2TopNode" obtained by coupling the extracted names of both top nodes by AND is given (step S4). In the example shown in FIG. 8, "LCD.a-sha.co.jp AND liquid crystal monitor.b-inc.co.jp" is given as the name of virtual page ComVPage. This naming rule enables synthesized pages to be differentiated from other pages. In the example shown in FIG. 8, the synthesized page is labeled "liquid crystal display" for convenience. The label may be specified freely by the user or may be automatically generated using another thesaurus.

Next, the respective lower node elements of the input thesauruses are named "Th1LowerNodeList" and "Th2LowerNodeList" (steps S5 and S6) and the respective lower node elements of the input thesauruses are sequentially compared with each other (steps S7 and S8). Since a thesaurus product operation leaves links contained in common nodes, elements having common labels are left. In the example shown in FIG. 8, the longest labels matching the beginning are regarded as common labels and partial labels "TFT" and "DSTN" are used as common labels.

For elements having such common partial labels, a synthesized name "Th1LowerNodeList[i] OR Th2LowerNodeList[j]" is generated (step S9) as a lower node name. Although the entire operation is thesaurus product, since lower nodes of each common node are represented as a list of actually existing nodes, a synthesized name is represented by OR. In the example shown in FIG. 8, a synthesized name is represented by "TFT system.a-sha.co.jp OR TFT type.b-inc.co.jp" or the like.

The obtained synthesized name is sequentially added to intermediate results named AndList and comparisons are performed repeatedly for all elements (step S10).

Next, when a list of common nodes, AndList, is obtained, the following processing is performed for each of these elements.

First, a synthesized lower node $n$ is generated as a virtual page and is stored in "lowerVPage[n]" (steps S11 and S12) and "AndList[n]" is set as the name of the page (step S13). In the example shown in FIG. 8, the name of the page is "TFT system.a-sha.co.jp OR TFT type.b-inc.co.jp".

Next, link Ln [n] is added to a synthesized thesaurus top page ComVPage (step S14), "AndList[n]" (actually, URA indicated by a name) is added to the link end (step S15), and further, a link to a raw material page that the contents of "AndList[n]" contain is set as the contents of "LowerVPage [n]" (step S16). In the example shown in FIG. 8, two links "TFT system.a-sha.co.jp" and "TFT type.b-inc.co.jp" are set. Since these pages exist originally as actual pages, the contents of actual pages are traced for the node and lower nodes even in the case of a synthesized thesaurus and therefore synthesis processing is unnecessary.

The above series of steps are repeated by the number of elements (steps S17 and S18) and thus synthesis processing on thesaurus product terminates.

Figure 14A:
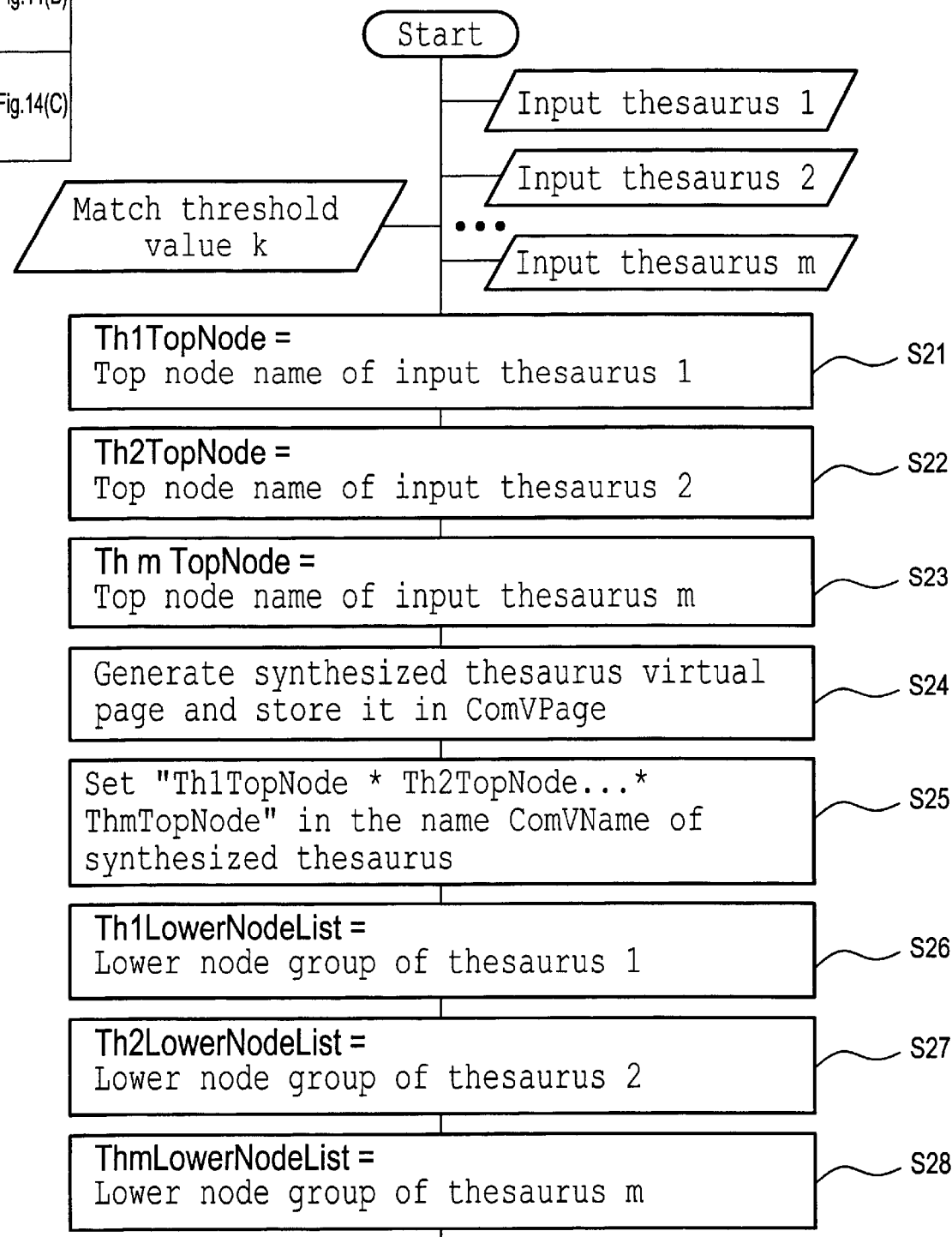
FIG. 14 is a flowchart showing an example of a by, procedure of thesaurus operation processing.
Figure 14B:
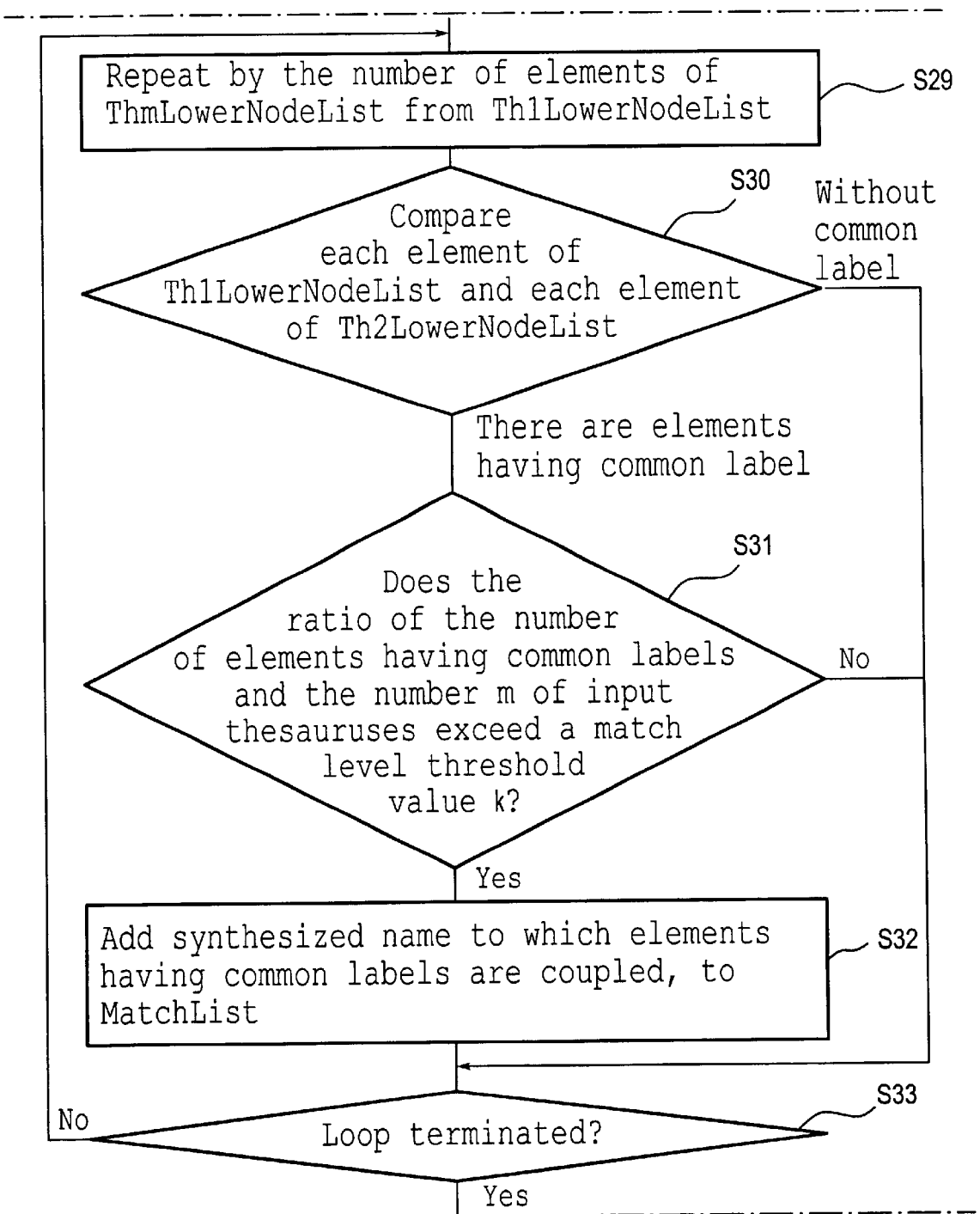
Figure 14C:
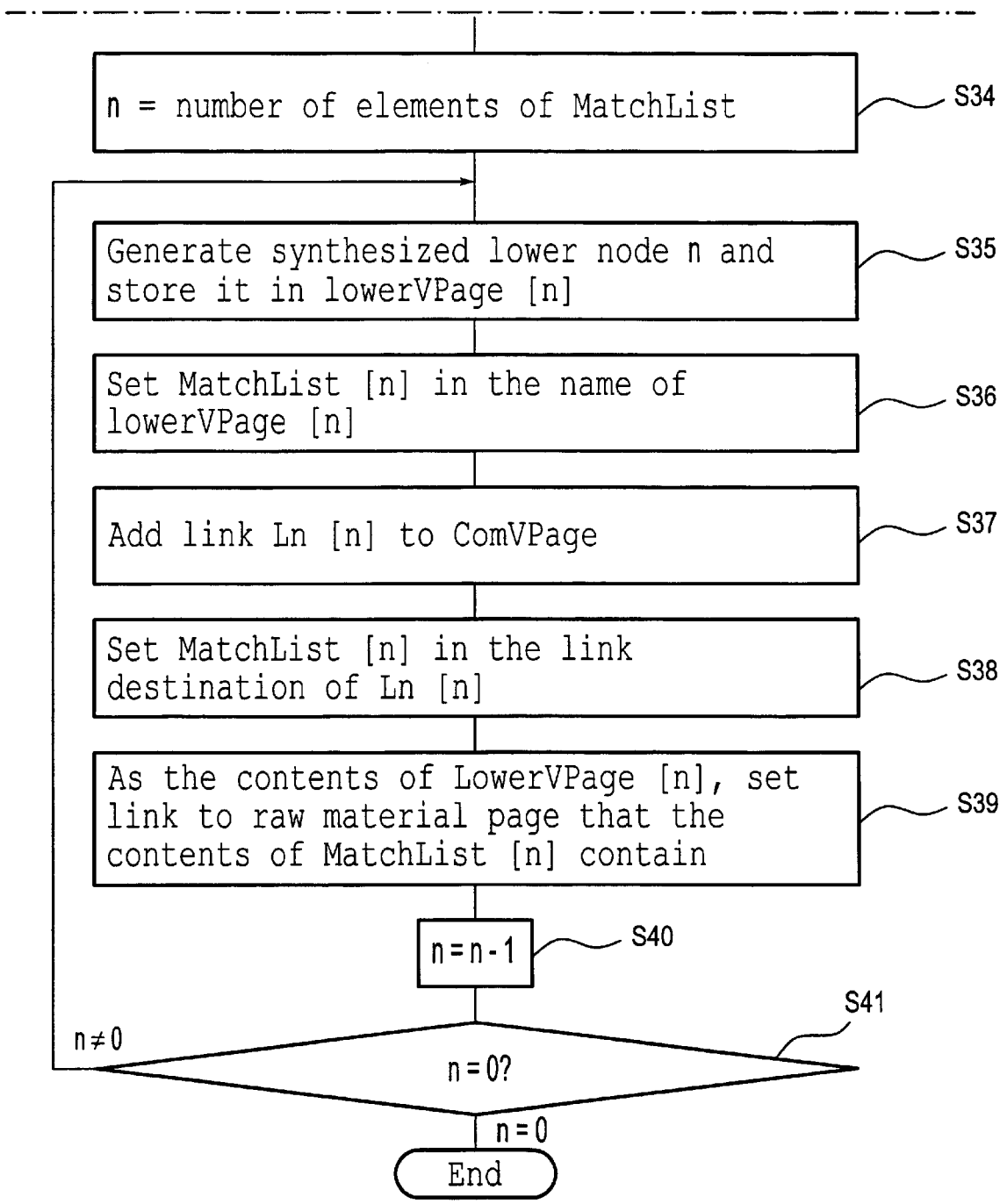

As described previously, basically, synthesis among three or more thesauruses can also be performed by combinations of one-to-one operations. On the other hand, there are cases where new merits are obtained by performing operations among a plurality of thesauruses at the same time. With respect to such an example, a variation of the above product operation will be described. More specifically, the processing is to determine a match level among a plurality of thesauruses by a given threshold value and is performed according to the flowchart shown in FIG. 14.

Although the overall flow is the same as that of the thesaurus product described previously and the thesaurus addition described later, the number of input thesauruses is increased from 2 to $m$, and to calculate a match level, a threshold value $K$ (e.g., 70% or more) is afforded and "*" is used as a symbol of match level operation.

First, the respective top node names "Th1TopNode", "Th2TopNode", . . . "ThmTopNode" of input thesauruses are extracted (steps S21, S22, and S23), a virtual page ComVPage to become a top node of a new and synthesized thesaurus is generated (step S24), and "Th1TopNode * Th2TopNode . . . * ThmTopNode" obtained by coupling both extracted top node names by * is afforded as the name of the page (step S25).

Next, the respective lower node elements of the input thesauruses are named "Th1LowerNodeList", "Th2LowerNodeList", . . . "ThmLowerNodeList" (steps S26, S27, and S28) and the respective lower node elements of the input thesauruses are sequentially compared with each other (steps S29, S30, and S31). The comparison processing for a match level calculates a ratio c/m, where $m$ is the number of input thesauruses and $c$ is the number of elements having common labels in target nodes within the input thesauruses. For example, if the number of input thesauruses is four and the number of elements having common labels in target nodes is three, c/m is 75%, which exceeds the threshold value $k$. Accordingly, a link with the three elements coupled by "*" is generated as a new synthesized name.

For elements having such common partial labels, a synthesized name is generated as a lower node name (step S32), the obtained synthesized name is sequentially added to intermediate results MatchList, and comparisons are performed repeatedly for all elements (step S33).

Next, when a list of common nodes, MatchList, is thus obtained, the following processing is performed for their respective elements.

First, a synthesized lower node $n$ is generated as a virtual page and stored in "lowerVPage[n]" (steps S34 and S35), and "MatchList[n]" is set as the name of the page (step S36). Link Ln[n] is added to a synthesized thesaurus top page ComVPage (step S37), "MatchList[n]" is added to the link end (step S38), and as the contents of "LowerVPage[n]", a link to a raw material page that the contents of "MatchList [n]" contain is set (step S39).

The above series of steps are repeated by the number of elements (steps S40 and S41) and synthesis processing involving a match level terminates.

It can be said that the above product operation and addition operation described later have special match levels 100% and non-zero, respectively.

Figure 15A:
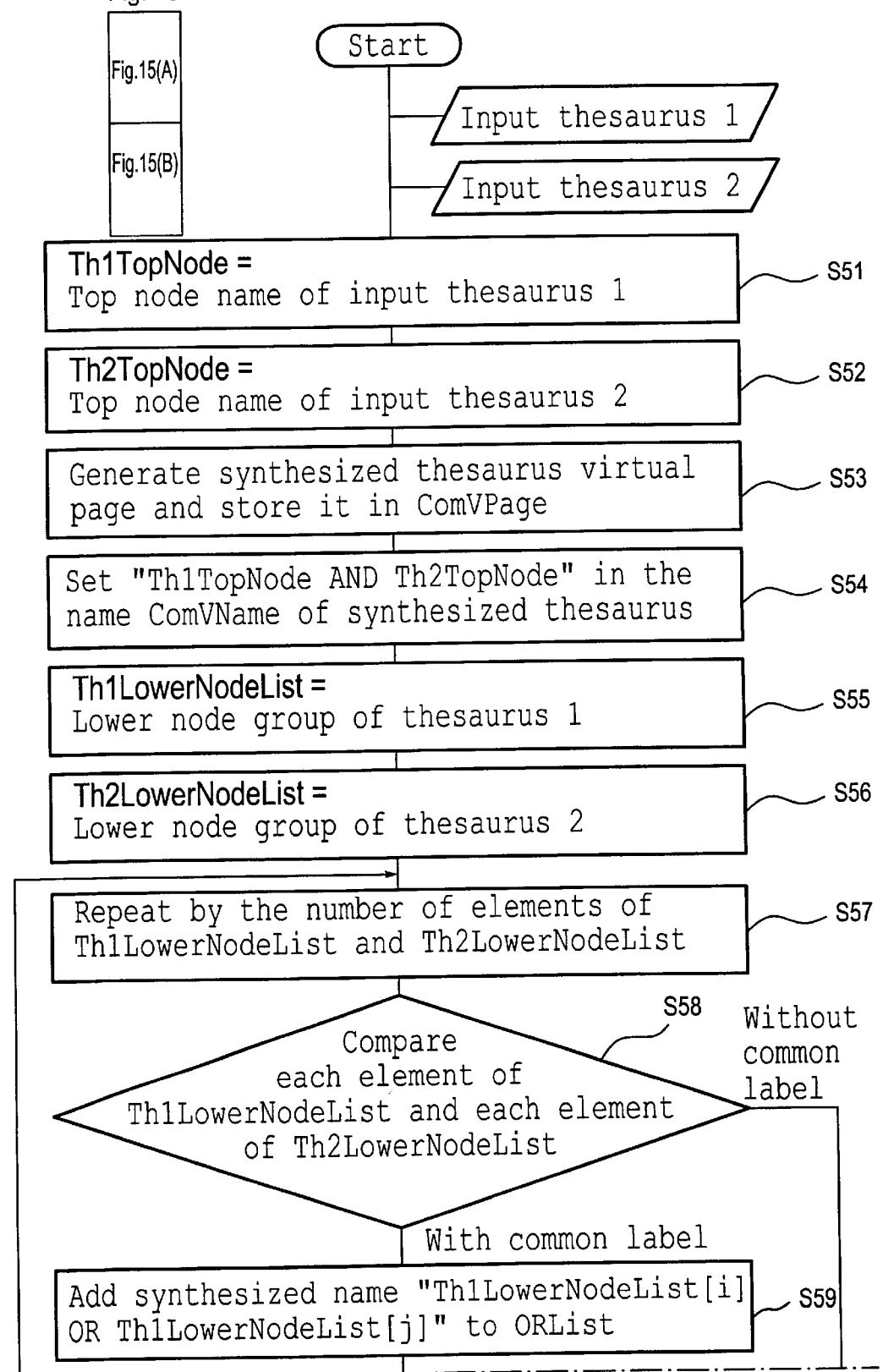
FIG. 15 is a flowchart showing an example of a procedure of thesaurus addition processing.
Figure 15B:
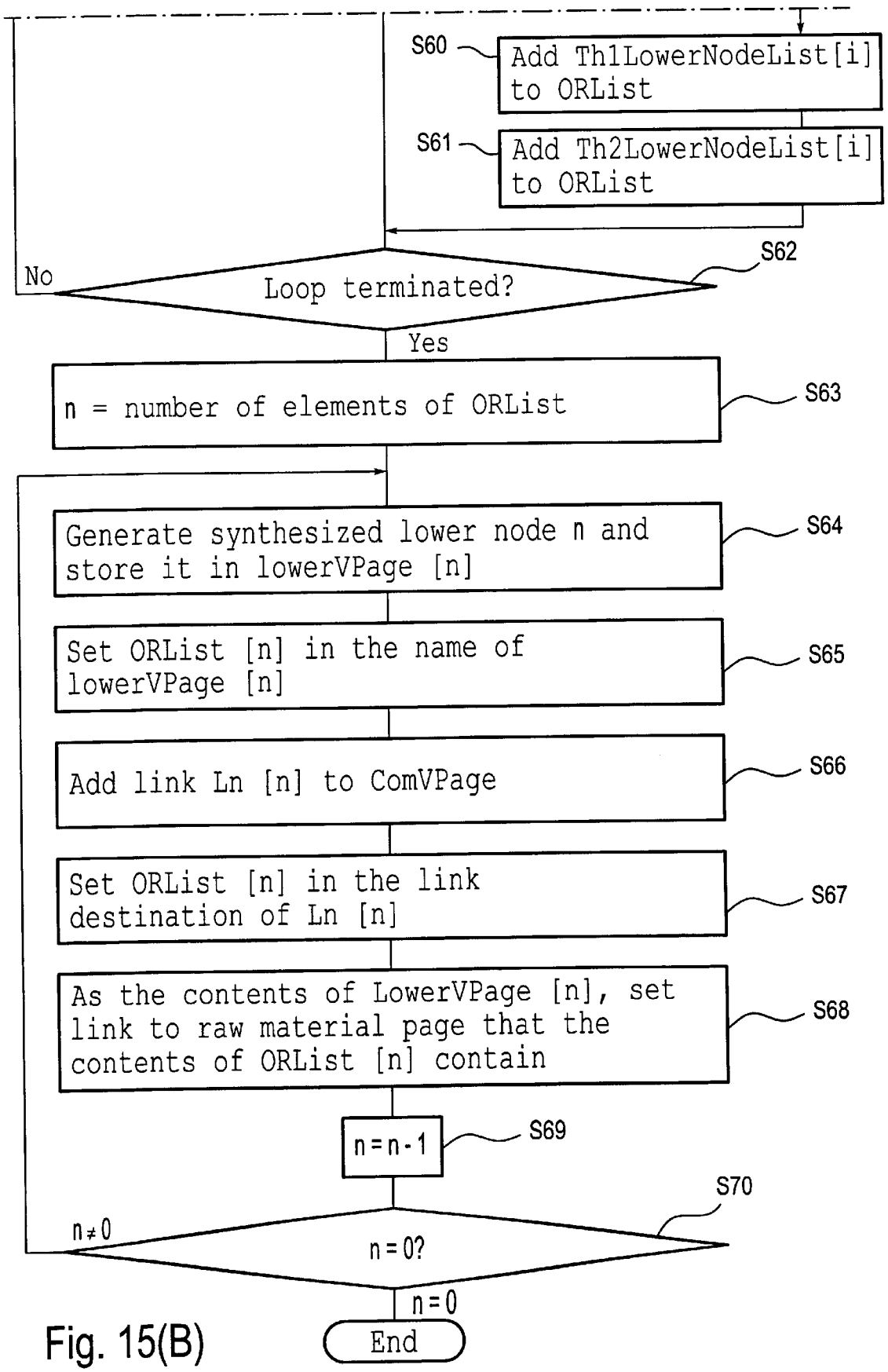

Next, if ". . . all drive systems" is specified Iin a request, thesaurus addition processing is performed. More specifically, all drive systems are listed as shown in FIG. 9 and, more concretely speaking, processing is performed according to the flowchart shown in FIG. 15. The addition processing is different from the thesaurus product (FIG. 13) described previously in that elements not having common labels are also added to intermediate results so that all elements are listed. That is, two retrieved thesauruses (input thesaurus 1 and input thesaurus 2) are inputted and the respective top node names "Th1TopNode" and "Th2TopNode" of the input thesauruses are extracted (steps S51 and S52). Avirtual page ComVpage of the top node of a new synthesized thesaurus is generated (step S53) and, as the name of the page, "Th1TopNode OR Th2TopNode" obtained by coupling the extracted names of both top nodes by OR is given (step S54). In the example shown in FIG. 9, "LCD.a-sha.co.jp OR liquid crystal monitor. b-inc.co.jp" is given as the name of virtual page ComVPage.

Next, the respective lower node elements of the input thesauruses are named "Th1LowerNodeList" and "Th2LowerNodeList" (steps S55 and S56) and the respective lower node elements of the input thesauruses are sequentially compared with each other (steps S57 and S58). Since a thesaurus addition operation leaves links contained in related nodes, the partial labels "TFT", "DSTN", "XLCD", and "ADSTN" in the example shown in FIG. 9 are left.

Specifically, for elements having common Ilabels, a synthesized name "Th1LowerNodeList[i] OR Th2LowerNodeList[j]" is generated as a lower node name (step S59), and for elements having partial labels not in common between the input thesauruses, synthesized names "Th1LowerNodeList[i]" and "Th2LowerNodeList[j]" are generated as lower node names (steps S60 and S61).

The obtained synthesized name is sequentially added to intermediate results ORList and comparisons are performed repeatedly for all elements (step S62).

Next, when a list of related nodes, ORList, is thus obtained, the following processing is performed for their respective elements.

First, a synthesized lower node n is generated as a virtual page and stored in "lowerVPage[n]" (steps S63 and S64), and "ORList[n]" is set as the name of the page (step S65).

Link Ln[n] is added to a synthesized thesaurus top page ComVPage (step S66), "ORList[n]" is added to the link end (step S67), and as the contents of "LowerVPage[n]", a link to a raw material page that the contents of "ORList[n]" contain is set (step The above series of steps are repeated by the number of elements (steps S69 and S70) and synthesis processing on thesaurus addition terminates.

Figure 16A:
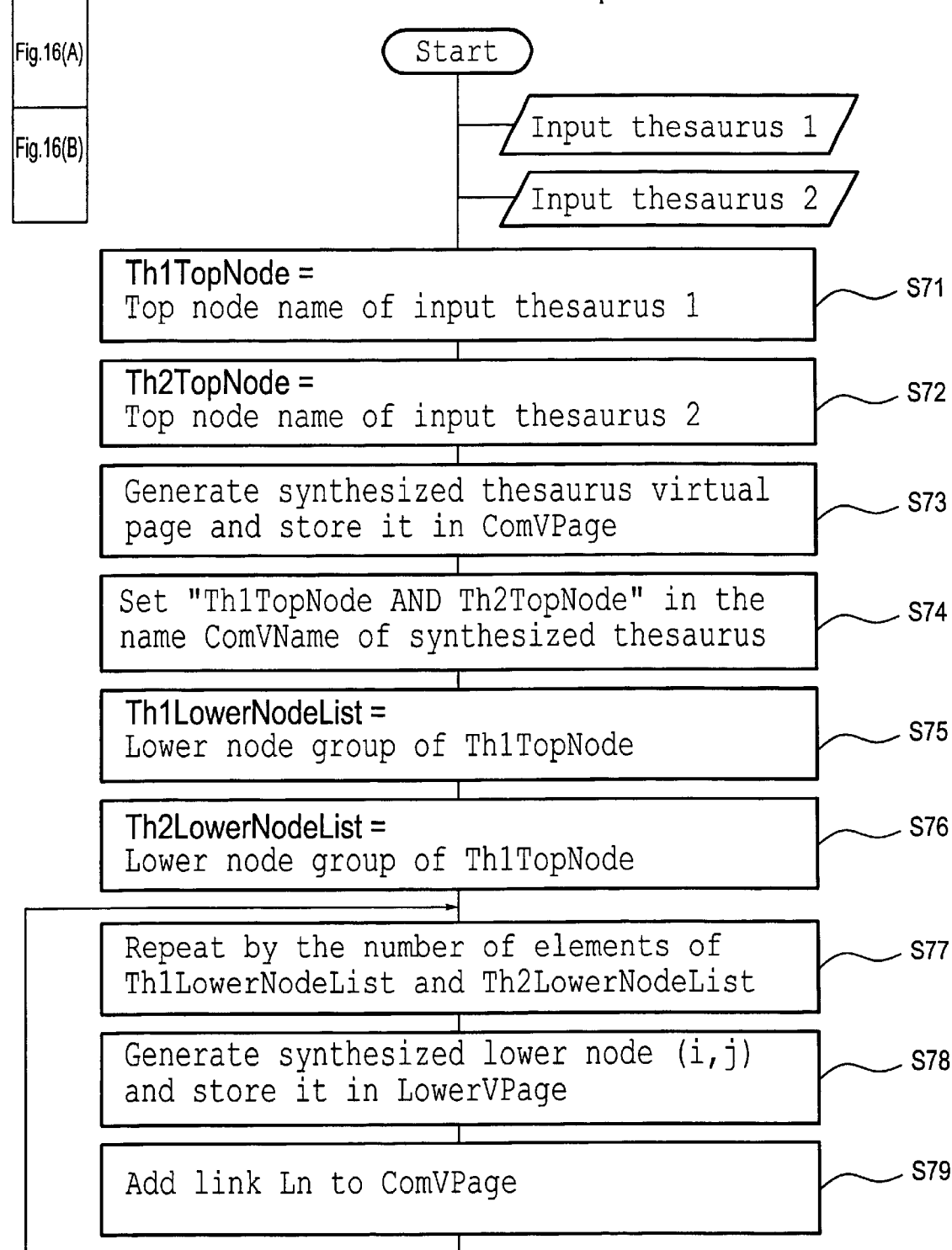
FIG. 16 is a flowchart showing an example of a procedure of thesaurus Cartesian processing.
Figure 16B:
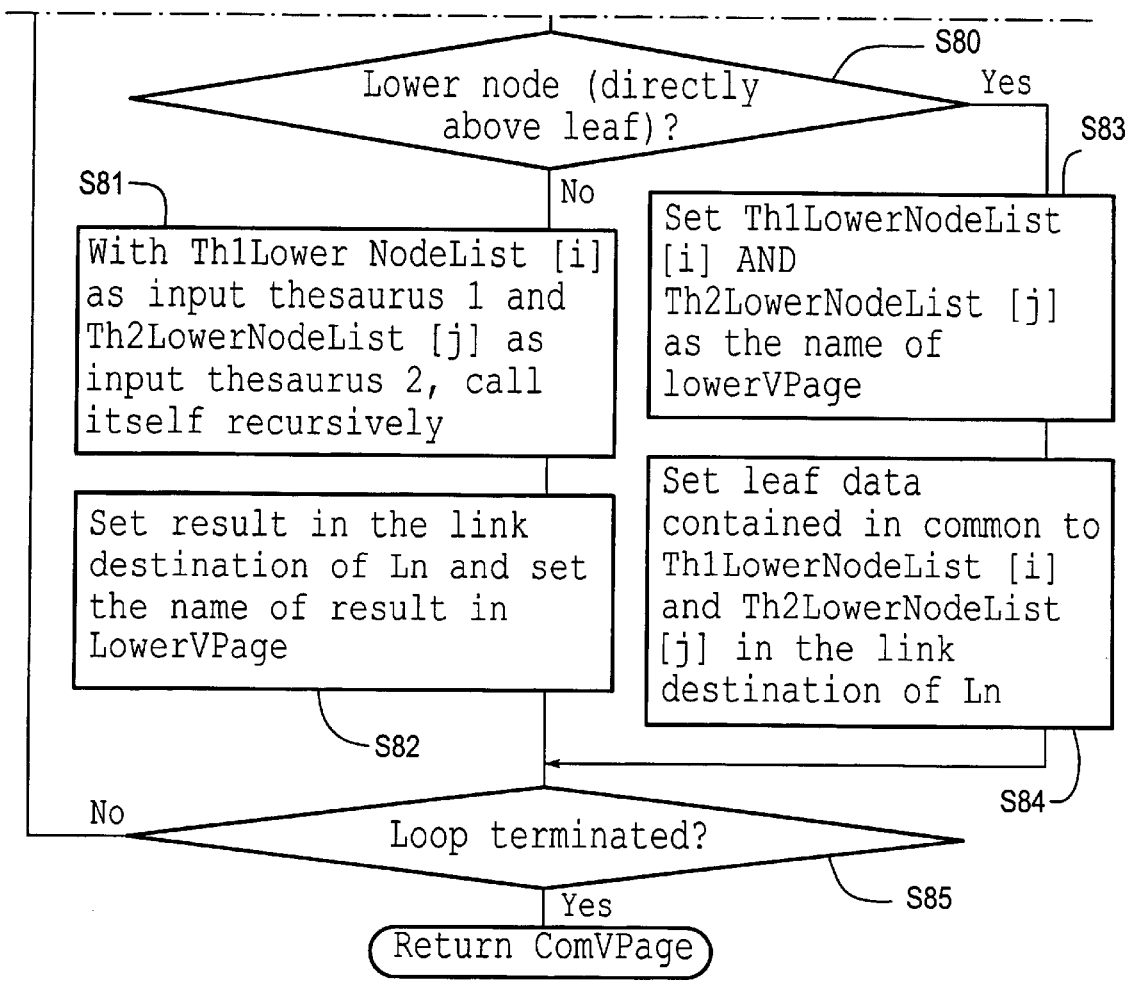

Next, in accordance with a request, thesaurus Cartesian product of the result of the above thesaurus product and "input system" is generated. Specifically, as shown in FIG. 10, the thesauruses are synthesized so that two aspects "drive system" and "input system" can be viewed at the same time, and more specifically, processing is performed in accordance with the flowchart shown in FIG. 16.

The thesaurus Cartesian product is different from thesaurus product and thesaurus addition in that a simple tree is not generated but all combinations are generated to constitute a matrix of two given attributes. To generate the combinations, AND is performed in lower virtual pages. In this example, since one input thesaurus is already a synthesized page, the name of a generated virtual page also consists of a combination such as "liquid crystal display.c-mag.co.jp ×(LCD.a-sha.co.jp AND liquid crystal monitor.b-inc.co.jp)".

That is, two retrieved thesauruses (input thesaurus 1 and input thesaurus 2) are inputted and the respective top node names "Th1TopNode" and "Th2TopNode" of the input thesauruses are extracted (steps S71 and S72). A virtual page ComVPage of the top node of a new synthesized thesaurus is generated (step S73) and, as the name of the page, "Th1TopNode ×Th2TopNode" obtained by coupling the extracted names of both top nodes by AND is given (step S74).

Next, the respective lower node elements of the input thesauruses are named "Th1LowerNodeList" and "Th2LowerNodeList" (steps S75 and S76) and the respective lower node elements of the input thesauruses are sequentially checked for the lowest nodes, and if they are not the lowest, new nodes are generated by all combinations of the relevant nodes (steps S77 to S85). In the example shown in FIG. 10, for other than the lowest nodes, new lower nodes are formed by all combinations of "VGA input" and "RGB input" of input signals and "TFT" and "DSTN" of drive systems, while, for the lowest nodes, nodes (leaves) contained in common in the input thesauruses are designated as new nodes.

That is, synthesized lower nodes are generated as virtual pages and stored in "lowerVPage" (step S78), and a link Ln is added to the synthesized thesaurus top page ComVPage (step S79).

It is checked whether lower node elements in the input thesauruses are the lowest in the relevant input thesaurus (step S80), and if they are not the lowest, Cartesian product of the elements "Th1LowerNodeList[i]" and "Th2LowerNodeList[j]" of the relevant lower node is formed by recursive calling (step S81), and the result is set in the end of link Ln, and the name of the result is set in LowerVPage (step S82).

On the other hand, for the lowest nodes, the name of "Th1LowerNodeList[i] AND Th2LowerNodeList[j]" is set in LowerVPage (step S83) and node data contained in common in the elements "Th1LowerNodeList[i]" and "Th2LowerNodeList[j]" of the relevant lower node is set in the end of link Ln.

Next, thesaurus shrinking is performed in accordance with a request. Basic operations of the shrinking is thesaurus transposition and thesaurus shrinking is performed by subjecting the result of a transposition operation to a thesaurus addition operation.

Sometimes, a rank relation as the basis of thesaurus classification may not square with user's purposes. For example, suppose the case where a user inputs requests "review the drive systems of liquid crystal by company" and "classify concepts including the TFT and DSTN systems into more detailed levels by company". By decomposing the latter query as a retrieval request, when the thesauruses shown in FIGS. 5 and 6 are merged by common rank relations as shown in FIG. 11, T2 and T3 are obtained as partial thesauruses containing the TFT and DSTN systems at the same time and T1 superior thereto is obtained as classification by company. The entire thesaurus contains classification by company at the highest level and classification by drive system at the lowest level. Since the thesaurus does not satisfy the request specifications in terms of rank relations, thesaurus transposition is applied here.

Figures 17, 17A:
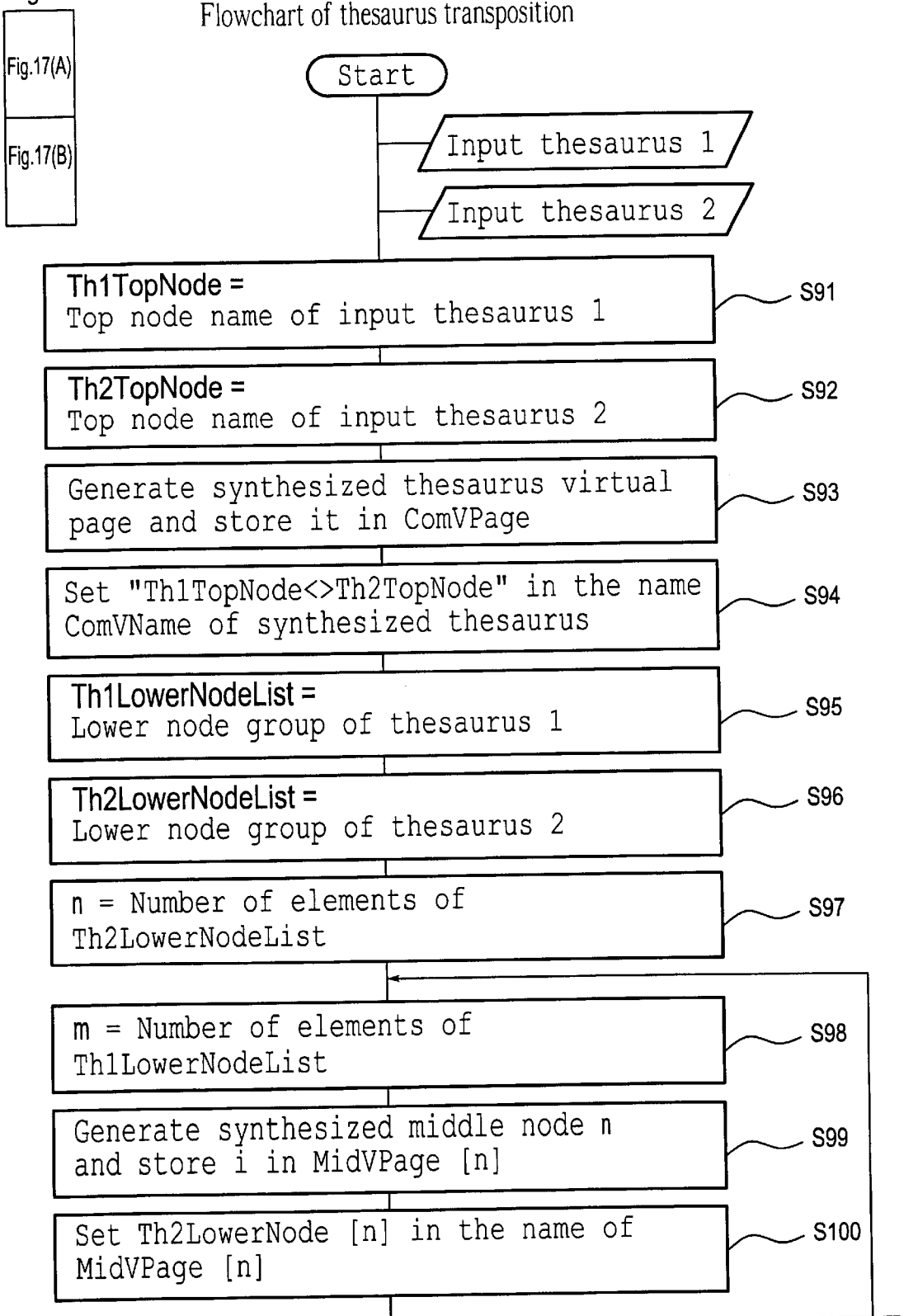
FIG. 17 is a flowchart showing an example of a procedure of thesaurus transposition processing.
Figure 17B:
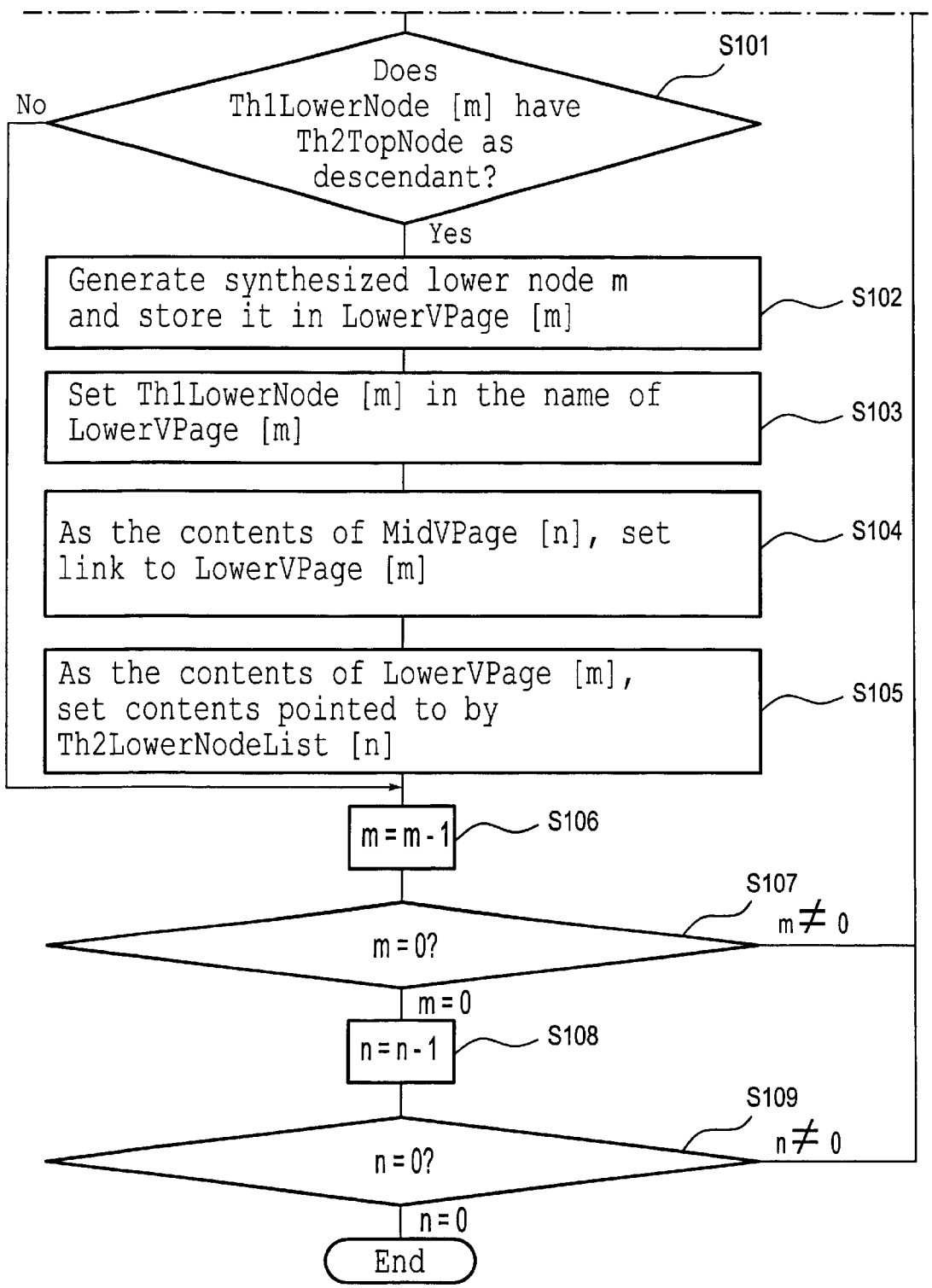

A transposition operation is performed in accordance with the flowchart shown in FIG. 17 for each of the partial thesauruses (T1 (input thesaurus 1)) and T2 (input thesaurus 2)).

First, the respective top node names "Th1TopNode" and "Th2TopNode" of the input thesauruses are extracted (steps S91 and S92), and a virtual page ComVPage of the top node of a new synthesized thesaurus is generated (step S93) and, as the name of the page, "Th1TopNode <> Th2TopNode" obtained by coupling the extracted names of both top nodes by <> is given (step S94). In the example shown in FIG. 11, a name of "products by various companies.dnet.ne.jp <> LCD.dnet.ne.jp" is given.

Next, the respective lower node elements of the input thesauruses are named "Th1LowerNodeList" and "Th2LowerNodeList" (steps S95 and S96), a synthesized middle node n is generated as a virtual page of the input thesaurus T2 (step S97), a synthesized lower node m is generated as a virtual page of the input thesaurus T1 (step S98), the synthesized middle node n is stored in "MidVPage [n]" (step S99), and "Th2LowerNode[n]" is set as the name of the page (step S100). That is, a lower node group Th2LowerNode[n] of T2 is given as the name of node MidVPage[n] linked from ComVPage.

Next, it is determined whether a lower node group Th1LowerNode[m] of T1 has T2 or Th2TopNode as a descendant (T2 may not be a direct child of T1) (step S101), and if so, the following series of steps are performed. That is, a synthesized lower node m is stored in "LowerVPage [m]" (step S102), Th1LowerNode[m] is set as the name of the page (step S103), a link to "LowerVPage[m]" is set as the contents of "MidVPage[n]" (step S104), and a link to the contents pointed to by "Th2LowerNodeList[n]" is set as the contents of "LowerVPage[m]" (step S105).

The above processing is performed repeatedly with respect to the respective numbers m and n of elements (steps S106 to S109) of the input thesauruses, and a transposition thesaurus T4 shown in FIG. 11 is obtained.

In the same way as the above, thesaurus transposition T5 (=T1<>T3) with respect to T3 can be calculated and finally thesaurus addition T6 (T4 OR T5) of T4 and T5 can be calculated, so that a thesaurus in which drive systems to satisfy the original request are further classified by company can be synthesized. That is, since intermediate links such as "LCD" are eliminated as a result, it can be said that the thesauruses are shrunken.

Two methods are available for the above synthesis of thesauruses; first, the synthesis is performed statically at a time including real data; second, as with retrieval, only pointers to partial thesauruses are stored, and real data is dynamically coupled during actual use in application 7. Which of the methods is selected depends on factors such as the size of the thesauruses, network speed, maintainability, and time required for coupling. In the above example, dynamic coupling is used to obtain a higher distribution effect and information about a thesaurus once synthesized is stored in the thesaurus memory unit 34. Since information to be thus stored is only pointers (URL) to partial thesauruses as retrieval results and synthesis expressions (combinations of basic operations such as thesaurus addition and thesaurus Cartesian product), the system becomes very compact. By doing so, since real data is coupled using the most recent information even if the real data is changed due to change of specifications or for other reasons, maintainability is very high.

The synthesized thesaurus stored in the thesaurus memory unit 34 is coupled with the real data when a request is received from an external application 7. Coupling with the real data is performed through the network 1 for an external thesaurus 2 determined from the name of a partial thesaurus stored in the thesaurus memory unit 34. In the external thesaurus receiving the request, consistency with the requested specifications is checked in the thesaurus specification on DB unit 23. Actually, a simple check of whether a specified URL exists can be made.

The real data is fetched from the thesaurus DB unit 21 and sent to a requesting source. In the example described previously, since one node of the thesauruses is described as one HTML file, required files may be sent via http.

A generated, new synthesized thesaurus can be used recursively as an external thesaurus on a network by disclosing its specifications, whereby the reuse of the thesaurus is remarkably improved.

As described above, according to the present invention, thesauruses meeting purposes which have been conventionally difficult to build can be obtained easily. Specifically, by defining basic operations on thesaurus synthesis, a new thesaurus can be synthesized from retrieved or user-inputted thesauruses, and further by coupling the new synthesized thesaurus and real data thereof during actual use, maintainability can be improved.

What is claimed is:

1. A thesaurus retrieval and synthesis system comprising:
   a memory that stores a thesaurus, which consists of pages each having a node provided with a concept and arcs to nodes related subordinate to said node, the plurality of nodes being related by rank relations, said nodes each being assigned a unique identifier, said arcs each being related with the identifier of a lower node;
   an input unit that accepts a request to define the thesauruses to be synthesized;
   a retrieval unit that retrieves pages matching identifiers corresponding to said request from said memory; and
   a synthesis unit that performs an operation corresponding to said request on a plurality of retrieved pages to form a new page containing a node assigned a new identifier, wherein said synthesis unit performs said operation on the concepts of lower nodes corresponding to the arc identifiers of retrieved pages and generates the arcs of said new page with new identifiers assigned, and further reads pages having lower nodes of said retrieved pages from said memory, applies said operation to the relevant pages to generate second pages, and relates said second pages with the arcs of said new page, whereby a new thesaurus with said new page as the top node is generated.

2. A thesaurus synthesis system comprising:
   a memory that stores a thesaurus, which consists of pages each having a node provided with a concept and arcs to nodes related subordinate to said node, the plurality of nodes being related by rank relations, said nodes each being assigned a unique identifier, said arcs each being related with the identifier of a lower node;
   a thesaurus input unit that accepts a plurality of pages, read from said memory, to be subjected to synthesis processing;
   a request input unit that accepts a request to define the thesauruses to be synthesized; and a synthesis unit that performs an operation corresponding to said request on a plurality of inputted pages to form a new page containing a node assigned a new identifier, wherein said synthesis unit performs said operation on the concepts of lower nodes corresponding to the arc identifiers of inputted pages and generates the arcs of said new page with new identifiers assigned, and further reads pages having lower nodes of said inputted pages from said memory, applies said operation to the relevant pages to generate second pages, and relates said second pages with the arcs of said new page, whereby a new thesaurus with said new page as the top node is generated.

3. The thesaurus synthesis system according to claim 2, wherein said operation detects a matching concept from lower nodes corresponding to arc identifiers among a plurality of said inputted pages, generates a second page having a node of the matching concept, and relates said second page with the arc of said new page.

4. The thesaurus synthesis system according to claim 2, wherein said operation detects a matching concept from lower nodes corresponding to arc identifiers among a plurality of said inputted pages, generates a second page having a node of a concept of a predetermined match level or higher, and relates the second page with the arc of said new page.

5. The thesaurus synthesis system according to claim 2, wherein said operation generates the arcs of said new page new identifiers assigned, by combinations of the arcs of said plurality of inputted pages, relates these newly generated arcs with second pages generated based on lower nodes corresponding to the original arcs subjected to the combination processing, and relates the nodes of concepts common among lower nodes of the original nodes subjected to the combination processing with the arcs of the second pages.

6. The thesaurus synthesis system according to claim 2, wherein said operation checks the concepts of lower nodes corresponding to arc identifiers among said plurality of inputted pages, generates a second page having the node of a concept contained in at least one lower node, and relates said second page with the arc of said new page.

7. A thesaurus conversion system comprising:

a memory that stores a thesaurus, which consists of pages each having a node provided with a concept and arcs to nodes related subordinate to said node, the plurality of nodes being related by rank relations, said nodes each being assigned a unique identifier, said arcs each containing the identifier of a lower node;

an input unit that accepts specification of a target node provided with a target concept; and a generation unit that generates a new thesaurus with the target node at the top by performing an operation so as to relate a node related subordinate to the target node with the target node and relate a node related superior to the target node with said target node.

8. A thesaurus retrieval and synthesis system which connects a thesaurus retrieval and synthesis device through a network to a plurality of thesaurus management devices that store a thesaurus, which consists of pages each having a node provided with a concept and arcs to nodes related subordinate to said node, the plurality of nodes being related by rank relations, said nodes each being assigned a unique identifier, said arcs each containing the identifier of a lower node, wherein said thesaurus retrieval and synthesis device comprises: an input unit that accepts a request to define the thesauruses to be synthesized; a retrieval unit that retrieves pages matching identifiers corresponding to said request from said thesaurus management devices; and a synthesis unit that synthesizes the plurality of retrieved pages into a new page containing a node to which a new identifier is assigned, by performing an operation corresponding to the request thereon, and said synthesis unit performs said operation on the concepts of lower nodes corresponding to the arc identifiers of retrieved pages and generates the arcs of said new page with new identifiers assigned, and further reads pages having lower nodes of said retrieved pages from said thesaurus management devices, applies said operation to the relevant pages to generate second pages, and relates said second pages with the arcs of said new page, whereby a new thesaurus with said new page as the top node is generated.

\* \* \* \* \*